(12) United States Patent
Kipnis

(10) Patent No.: US 11,405,366 B2
(45) Date of Patent: Aug. 2, 2022

(54) ANONYMOUS COLLECTION OF DATA FROM A GROUP OF ENTITLED MEMBERS

(71) Applicant: Mobileye Vision Technologies Ltd., Jerusalem (IL)

(72) Inventor: Aviad Kipnis, Efrat (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

(21) Appl. No.: 17/615,726

(22) PCT Filed: Jan. 19, 2021

(86) PCT No.: PCT/IB2021/000016
§ 371 (c)(1),
(2) Date: Dec. 1, 2021

(87) PCT Pub. No.: WO2021/144654
PCT Pub. Date: Jul. 22, 2021

(65) Prior Publication Data
US 2022/0150222 A1 May 12, 2022

Related U.S. Application Data

(60) Provisional application No. 62/963,047, filed on Jan. 19, 2020.

(51) Int. Cl.
*H04L 29/06* (2006.01)
*H04L 9/40* (2022.01)
(Continued)

(52) U.S. Cl.
CPC ........ *H04L 63/0421* (2013.01); *H04L 9/0869* (2013.01); *H04L 9/3247* (2013.01)

(58) Field of Classification Search
CPC .. H04L 63/0421; H04L 9/0869; H04L 9/3247
See application file for complete search history.

(56) References Cited

U.S. PATENT DOCUMENTS 6,209,093 B1 * 3/2001 Venkatesan ............. G06F 21/64
713/176
8,015,316 B2 * 9/2011 Tazzari ................... H04L 7/048
709/230

(Continued)

FOREIGN PATENT DOCUMENTS

WO WO-2021144654 A1 7/2021

OTHER PUBLICATIONS

"International Application Serial No. PCT/IB2021/000016, International Search Report dated May 3, 2021", 4 pgs.

(Continued)

*Primary Examiner* — Ghodrat Jamshidi
(74) *Attorney, Agent, or Firm* — Schwegman Lundberg & Woessner, P.A.

(57) ABSTRACT

A method for collecting data from a group of entitled members. The method may include receiving, by a collection unit, a message and a message signature; validating, by the collection unit, whether the message was received from any of the entitled members of the group, without identifying the entitled member that sent the message; wherein the validating comprises applying a second plurality of mathematical operations on first group secrets, second group secrets and a first part of the message signature; and rejecting, by the collection unit, the message when validating that the message was not received from any entitled member of the group.

34 Claims, 12 Drawing Sheets

(51) Int. Cl.
    *H04L 9/08*    (2006.01)
    *H04L 9/32*    (2006.01)

(56) References Cited

U.S. PATENT DOCUMENTS

| | | | |
|---|---|---|---|
| 8,019,084 B1* | 9/2011 | Zajkowski | H04L 63/12 |
| | | | 713/168 |
| 9,419,949 B2* | 8/2016 | Sharma | H04L 9/0861 |
| 11,025,642 B1* | 6/2021 | Jezorek | H04L 51/12 |
| 2003/0147534 A1* | 8/2003 | Ablay | H04L 9/3271 |
| | | | 713/170 |
| 2013/0346741 A1 | 12/2013 | Kim et al. | |
| 2018/0004957 A1* | 1/2018 | Kocher | H04L 9/0861 |
| 2018/0083784 A1* | 3/2018 | Sharma | H04L 9/0825 |
| 2021/0028946 A1* | 1/2021 | Scott | H04L 9/3257 |
| 2021/0211271 A1* | 7/2021 | Kuang | H04L 9/3239 |

OTHER PUBLICATIONS

"International Application Serial No. PCT/IB2021/000016, Written Opinion dated May 3, 2021", 6 pgs.

* cited by examiner

ANONYMOUS COLLECTION OF DATA FROM A GROUP OF ENTITLED MEMBERS

PRIORITY CLAIM

This application is a U.S. National Stage Application under 35 U.S.C. 371 from International Application No. PCT/IB2021/000016, filed Jan. 19, 2021, and published as WO 2021/144654 on Jul. 22, 2021, which claims the benefit of priority to U.S. Provisional Application Ser. No. 62/963,047, filed Jan. 19, 2020, which are incorporated herein by reference in their entirety.

BACKGROUND

Advanced driver assistance systems (ADAS) and autonomous vehicle (AV) systems use cameras and other sensors together with object classifiers, which are designed to detect specific objects in an environment of a vehicle navigating a road. Object classifiers are designed to detect predefined objects and are used within ADAS and AV systems to control the vehicle or alert a driver based on the type of object that is detected its location, etc.

As ADAS and AV systems progress towards fully autonomous operation, it would be beneficial to protect data generated by these systems.

SUMMARY

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples.

Disclosed embodiments provide systems and methods that can be used as part of or in combination with autonomous navigation/driving and/or driver assist technology features. Driver assist technology refers to any suitable technology to assist drivers in the navigation and/or control of their vehicles, such as forward collision warning (FCW), lane departure warning (LDW) and traffic sign recognition (TSR), as opposed to fully autonomous driving. In various embodiments, the system may include one, two or more cameras mountable in a vehicle and an associated processor that monitor the environment of the vehicle. In further embodiments, additional types of sensors can be mounted in the vehicle and can be used in the autonomous navigation and/or driver assist system. In some examples of the presently disclosed subject matter, the system may provide techniques for processing images of an environment ahead of a vehicle navigating a road for training a neural networks or deep learning algorithms to estimate a future path of a vehicle based on images. In yet further examples of the presently disclosed subject matter, the system may provide techniques for processing images of an environment ahead of a vehicle navigating a road using a trained neural network to estimate a future path of the vehicle.

There are provided systems, methods, as illustrated in the claims and the specification.

Any combination of any subject matter of any claim may be provided.

Any combination of any method and/or method step disclosed in any figure and/or in the specification may be provided.

Any combination of any unit, device, and/or component disclosed in any figure and/or in the specification may be provided. Non-limiting examples of such units include a gather unit, an image processor, and the like.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
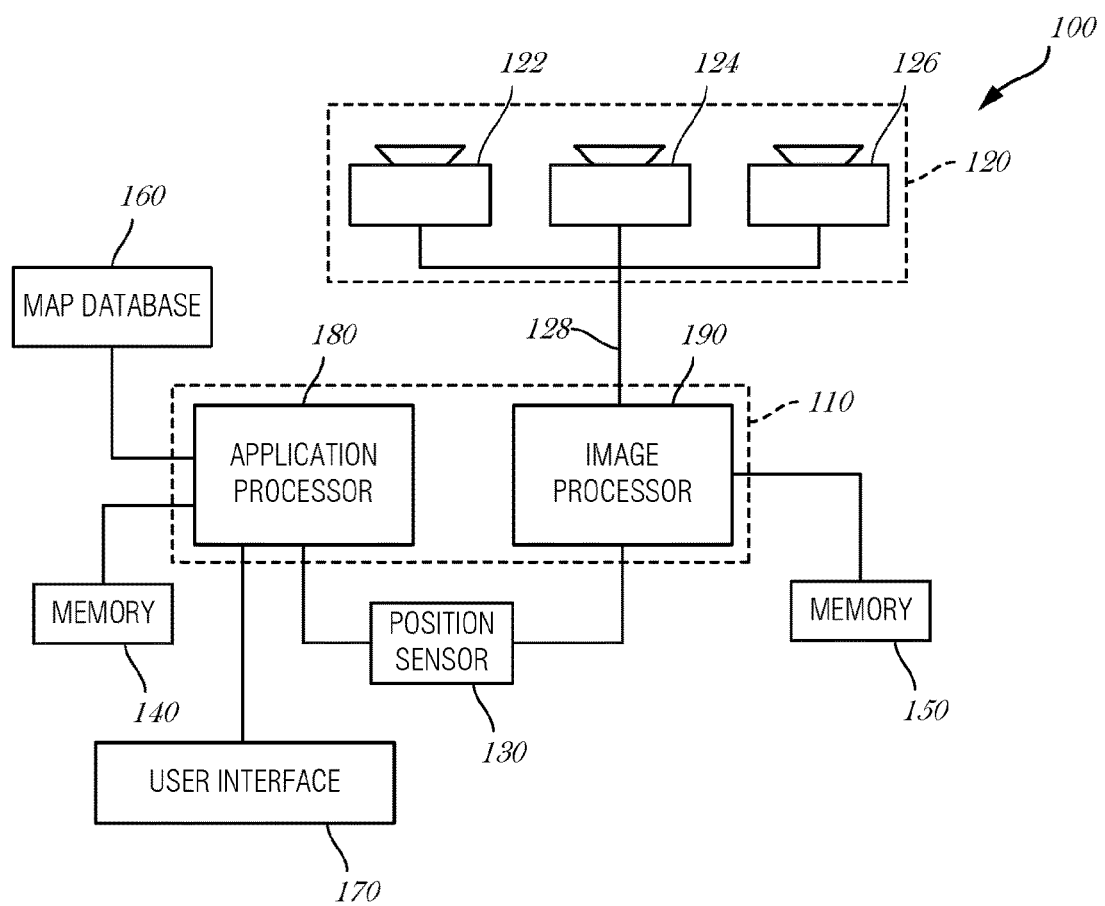
FIG. 1 is a block diagram representation of a system consistent with the disclosed embodiments.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by the memory device and should be applied mutatis mutandis to a non-transitory computer readable medium that stores instructions that may be executed by the memory device.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

A pixel may be a picture element obtained by a camera, may be a processed picture element.

Before discussing in detail examples of features of the processing images of an environment ahead of a vehicle navigating a road for training a neural networks or deep learning algorithms to estimate a future path of a vehicle based on images or feature of the processing of images of an environment ahead of a vehicle navigating a road using a trained neural network to estimate a future path of the vehicle, there is provided a description of various possible implementations and configurations of a vehicle mountable system that can be used for carrying out and implementing the methods according to examples of the presently disclosed subject matter. In some embodiments, various examples of the system can be mounted in a vehicle and can be operated while the vehicle is in motion. In some embodiments, the system can implement the methods according to examples of the presently disclosed subject matter.

However, it would be appreciated that embodiments of the present disclosure are not limited to scenarios where a suspected upright object indication is caused by a high-grade road. The suspected upright object indication can be associated with various other circumstances, and can result from other types of image data and also from data that is not image based or is not exclusively image based, as well.

FIG. 1, to which reference is now made, is a block diagram representation of a system consistent with the disclosed embodiments. System 100 can include various components depending on the requirements of a particular implementation. In some examples, system 100 can include a processing unit 110, an image acquisition unit 120 and one or more memory units 140, 150. Processing unit 110 can include one or more processing devices. In some embodiments, processing unit 110 can include an application processor 180, an image processor 190, or any other suitable processing device. Similarly, image acquisition unit 120 can include any number of image acquisition unit s and components depending on the requirements of a particular application. In some embodiments, image acquisition unit 120 can include one or more image capture devices (e.g., cameras), such as image capture device 122, image capture device 124, and image capture device 126. In some embodiments, system 100 can also include a data interface 128 communicatively connecting processing unit 110 to image acquisition unit 120. For example, data interface 128 can include any wired and/or wireless link or links for transmitting image data acquired by image acquisition unit 120 to processing unit 110.

Both application processor 180 and image processor 190 can include various types of processing devices. For example, either or both of application processor 180 and image processor 190 can include one or more microprocessors, preprocessors (such as image preprocessors), graphics processors, central processing units (CPUs), support circuits, digital signal processors, integrated circuits, memory, or any other types of devices suitable for running applications and for image processing and analysis. In some embodiments, application processor 180 and/or image processor 190 can include any type of single or multi-core processor, mobile device microcontroller, central processing unit, etc. Various processing devices can be used, including, for example, processors available from manufacturers such as Intel®, AMD®, etc. and can include various architectures (e.g., x86 processor, ARM®, etc.).

In some embodiments, application processor 180 and/or image processor 190 can include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture has two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP® and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third-generation processor and is six times more powerful that the EyeQ2®, may be used in the disclosed examples. In yet another example, the EyeQ4®, the fourth-generation processor, may be used in the disclosed examples.

While FIG. 1 depicts two separate processing devices included in processing unit 110, more or fewer processing devices can be used. For example, in some examples, a single processing device may be used to accomplish the tasks of application processor 180 and image processor 190. In other embodiments, these tasks can be performed by more than two processing devices.

Processing unit 110 can include various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor can include a video processor for capturing, digitizing, and processing the imagery from the image sensors. The CPU can include any number of microcontrollers or microprocessors. The support circuits can be any number of circuits generally well known in the art, including cache, power supply, clock, and input-output circuits. The memory can store software that, when executed by the processor, controls the operation of the system. The memory can include databases and image processing software, including a trained system, such as a neural network, for example. The memory can include any number of random access memories, read only memories, flash memories, disk drives, optical storage, removable storage, and other types of storage. In one instance, the memory can be separate from the processing unit 110. In another instance, the memory can be integrated into the processing unit 110.

Each memory 140, 150 can include software instructions that when executed by a processor (e.g., application processor 180 and/or image processor 190), can control operation of various aspects of system 100. These memory units can include various databases and image processing software. The memory units 140, 150 can include random access memory, read only memory, flash memory, disk drives, optical storage, tape storage, removable storage, and/or any other types of storage. In some examples, memory units 140, 150 can be separate from the application processor 180 and/or image processor 190. In other embodiments, these memory units can be integrated into application processor 180 and/or image processor 190.

In some embodiments, the system can include a position sensor 130. The position sensor 130 can include any type of device suitable for determining a location associated with at least one component of system 100. In some embodiments, position sensor 130 can include a GPS receiver. Such receivers can determine a user position and velocity by processing signals broadcasted by global positioning system satellites. Position information from position sensor 130 can be made available to application processor 180 and/or image processor 190.

In some embodiments, the system 100 can be operatively connectible to various systems, devices and units onboard a vehicle in which the system 100 can be mounted, and through any suitable interfaces (e.g., a communication bus) the system 100 can communicate with the vehicle's systems. Examples of vehicle systems with which the system 100 can cooperate include: a throttling system, a braking system, and a steering system (e.g., throttling system 220, braking system 230, and steering system 240 of FIG. 2E).

In some embodiments, the system 100 can include a user interface 170. User interface 170 can include any device suitable for providing information to or for receiving inputs from one or more users of system 100, including, for example, a touchscreen, microphone, keyboard, pointer devices, track wheels, cameras, knobs, buttons, etc. Information can be provided by the system 100, through the user interface 170, to the user.

In some embodiments, the system 100 can include a map database 160. The map database 160 can include any type of database for storing digital map data. In some examples, map database 160 can include data relating to a position, in a reference coordinate system, of various items, including roads, water features, geographic features, points of interest, etc. Map database 160 can store not only the locations of such items, but also descriptors relating to those items, including, for example, names associated with any of the stored features and other information about them. For example, locations and types of known obstacles can be included in the database, information about a topography of a road or a grade of certain points along a road, etc. In some embodiments, map database 160 can be physically located with other components of system 100. Alternatively, or additionally, map database 160 or a portion thereof can be located remotely with respect to other components of system 100 (e.g., processing unit 110). In such embodiments, information from map database 160 can be downloaded over a wired or wireless data connection to a network (e.g., over a cellular network and/or the Internet, etc.).

Image capture devices 122, 124, and 126 can each include any type of device suitable for capturing at least one image from an environment. Moreover, any number of image capture devices can be used to acquire images for input to the image processor. Some examples of the presently disclosed subject matter can include or can be implemented with only a single-image capture device, while other examples can include or can be implemented with two, three, or even four or more image capture devices. Image capture devices 122, 124, and 126 will be further described with reference to FIGS. 2B-2E, below.

It would be appreciated that the system 100 can include or can be operatively associated with other types of sensors, including for example: an acoustic sensor, a radio frequency (RF) sensor (e.g., radar transceiver), a LIDAR sensor. Such sensors can be used independently of or in cooperation with the image acquisition unit 120. For example, the data from the radar system (not shown) can be used for validating the processed information that is received from processing images acquired by the image acquisition unit 120, e.g., to filter certain false positives resulting from processing images acquired by the image acquisition unit 120, or it can be combined with or otherwise compliment the image data from the image acquisition unit 120, or some processed variation or derivative of the image data from the image acquisition unit 120.

Figure 2A:
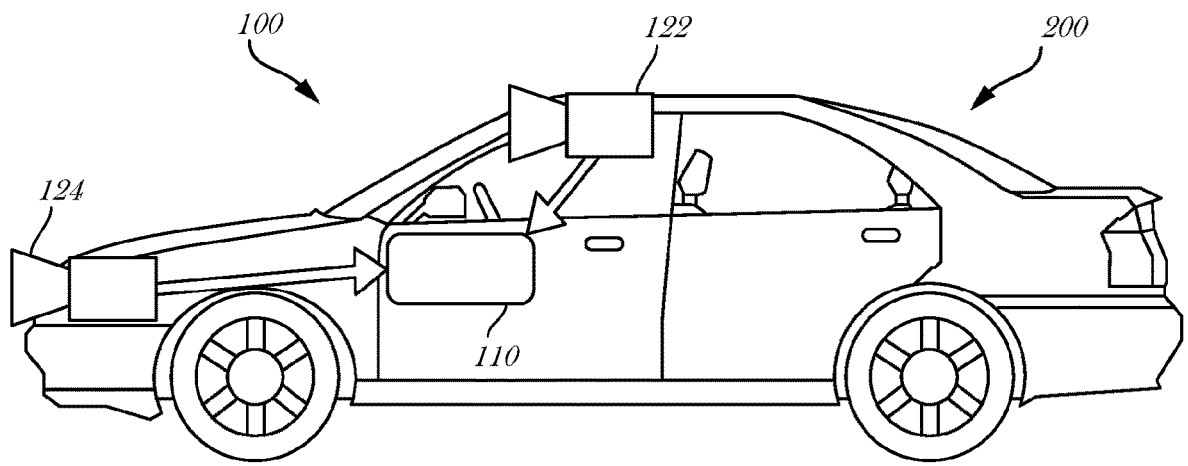
FIG. 2A is a diagrammatic side view representation of an exemplary vehicle including a system consistent with the disclosed embodiments.

System 100, or various components thereof, can be incorporated into various different platforms. In some embodiments, system 100 may be included on a vehicle 200, as shown in FIG. 2A. For example, vehicle 200 can be equipped with a processing unit 110 and any of the other components of system 100, as described above relative to FIG. 1. While in some embodiments, vehicle 200 can be equipped with only a single image capture device (e.g., camera), in other embodiments, such as those discussed in connection with FIGS. 2B-2E, multiple image capture devices can be used. For example, either of image capture devices 122 and 124 of vehicle 200, as shown in FIG. 2A, can be part of an ADAS (Advanced Driver Assistance Systems) imaging set.

The image capture devices included on vehicle 200 as part of the image acquisition unit 120 can be positioned at any suitable location. In some embodiments, as shown in FIGS. 2A-2E and 3, image capture device 122 can be located in the vicinity of the rearview mirror. This position may provide a line of sight similar to that of the driver of vehicle 200, which can aid in determining what is and is not visible to the driver.

Other locations for the image capture devices of image acquisition unit 120 can also be used. For example, image capture device 124 can be located on or in a bumper of vehicle 200. Such a location can be especially suitable for image capture devices having a wide field of view. The line of sight of bumper-located image capture devices can be different from that of the driver. The image capture devices (e.g., image capture devices 122, 124, and 126) can also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc. The image capture unit 120, or an image capture device that is one of a plurality of image capture devices that are used in an image capture unit 120, can have a field-of-view (FOV) that is different than the FOV of a driver of a vehicle, and not always see the same objects. In one example, the FOV of the image acquisition unit 120 can extend beyond the FOV of a typical driver and can thus image objects which are outside the FOV of the driver. In yet another example, the FOV of the image acquisition unit 120 is some portion of the FOV of the driver. In some embodiments, the FOV of the image acquisition unit 120 corresponding to a sector which covers an area of a road ahead of a vehicle and possibly also surroundings of the road.

In addition to image capture devices, vehicle 200 can include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

Figure 2B:
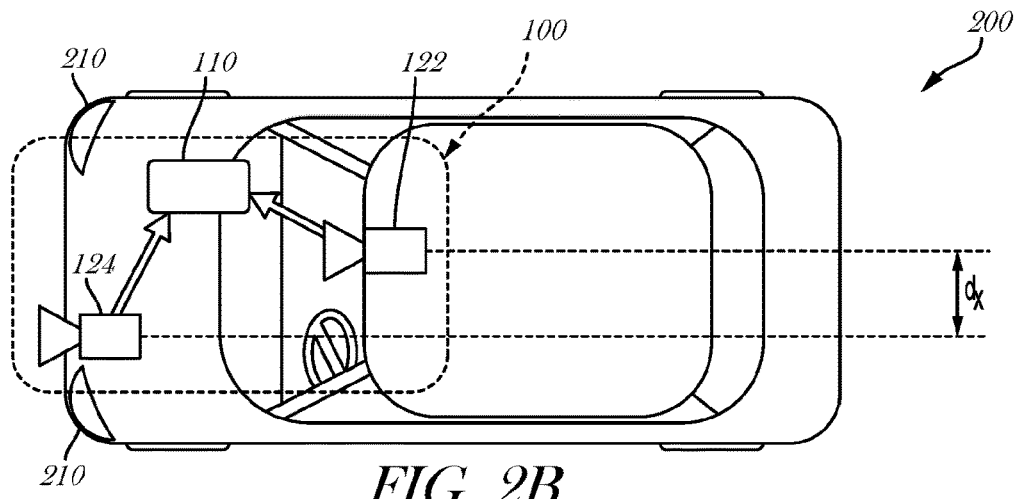
FIG. 2B is a diagrammatic top view representation of the vehicle and system shown in FIG. 2A consistent with the disclosed embodiments.

FIG. 2A is a diagrammatic side view representation of a vehicle imaging system according to examples of the presently disclosed subject matter. FIG. 2B is a diagrammatic top view illustration of the example shown in FIG. 2A. As illustrated in FIG. 2B, the disclosed examples can include a vehicle 200 including a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
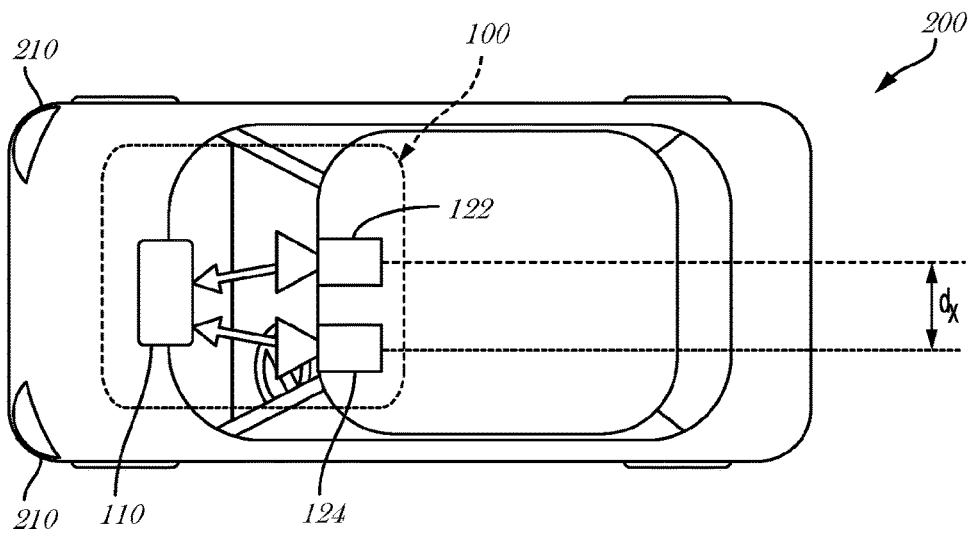
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiment shown in FIG. 2D, first, second, and third image capture devices 122, 124, and 126, are included in the system 100 of vehicle 200.

Figure 2D:
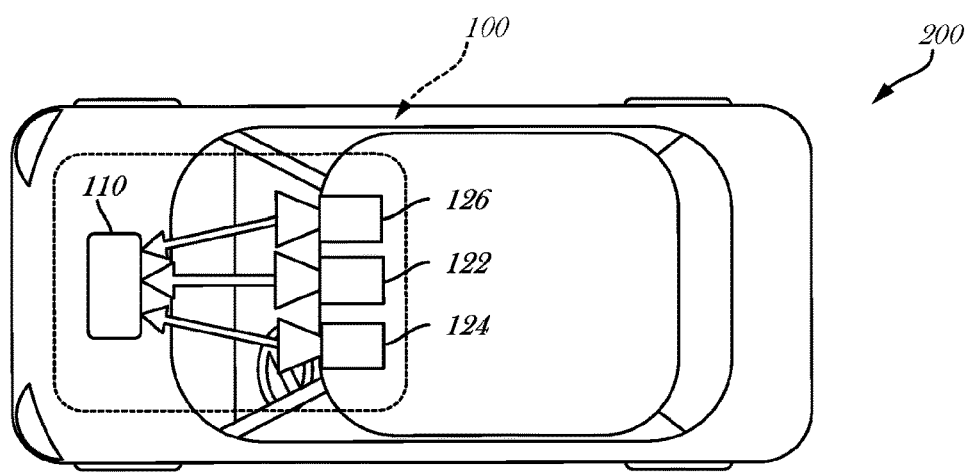
FIG. 2D is a diagrammatic top view representation of yet another embodiment of a vehicle including a system consistent with the disclosed embodiments.

As shown in FIG. 2D, image capture devices 122, 124, and 126 may be positioned in the vicinity of the rearview mirror and/or near the driver seat of vehicle 200. The disclosed examples are not limited to any particular number and configuration of the image capture devices, and the image capture devices may be positioned in any appropriate location within and/or on vehicle 200.

It is also to be understood that disclosed embodiments are not limited to a particular type of vehicle 200 and may be applicable to all types of vehicles including automobiles, trucks, trailers, motorcycles, bicycles, self-balancing transport devices and other types of vehicles.

The first image capture device 122 can include any suitable type of image capture device. Image capture device 122 can include an optical axis. In one instance, the image capture device 122 can include an Aptina M9V024 WVGA sensor with a global shutter. In another example, a rolling shutter sensor can be used. Image acquisition unit 120, and any image capture device which is implemented as part of the image acquisition unit 120, can have any desired image resolution. For example, image capture device 122 can provide a resolution of 1280×960 pixels and can include a rolling shutter.

Image acquisition unit 120, and any image capture device which is implemented as part of the image acquisition unit 120, can include various optical elements. In some embodiments one or more lenses can be included, for example, to provide a desired focal length and field of view for the image acquisition unit 120, and for any image capture device which is implemented as part of the image acquisition unit 120. In some examples, an image capture device which is implemented as part of the image acquisition unit 120 can include or be associated with any optical elements, such as a 6 mm lens or a 12 mm lens, for example. In some examples, image capture device 122 can be configured to capture images having a desired (and known) field-of-view (FOV).

The first image capture device 122 may have a scan rate associated with acquisition of each of the first series of image scan lines. The scan rate may refer to a rate at which an image sensor can acquire image data associated with each pixel included in a particular scan line.

Figure 2E:
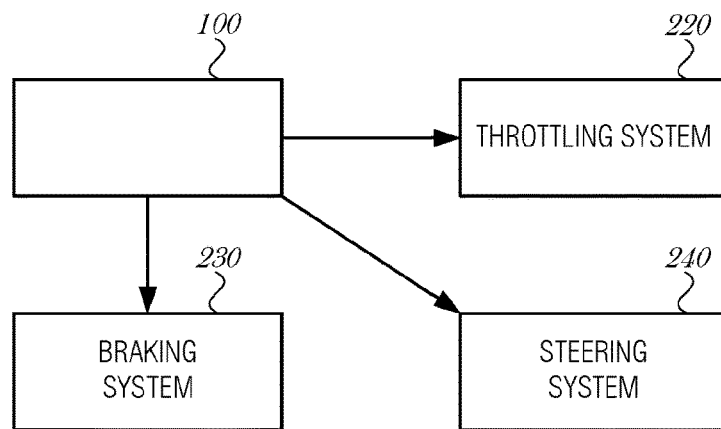
FIG. 2E is a diagrammatic representation of exemplary vehicle control systems consistent with the disclosed embodiments.

FIG. 2E is a diagrammatic representation of vehicle control systems, according to examples of the presently disclosed subject matter. As indicated in FIG. 2E, vehicle 200 can include throttling system 220, braking system 230, and steering system 240. System 100 can provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 can provide control signals to one or more of throttling system 220, braking system 230, and steering system 240 to navigate vehicle 1200 (e.g., by causing an acceleration, a turn, a lane shift, etc.). Further, system 100 can receive inputs from one or more of throttling system 220, braking system 230, and steering system 240 indicating operating conditions of vehicle 200 (e.g., speed, whether vehicle 200 is braking and/or turning, etc.).

Figure 3:
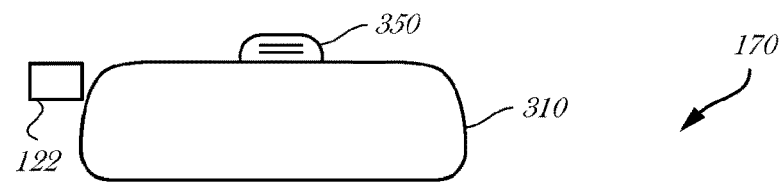
FIG. 3 is a diagrammatic representation of an interior of a vehicle including a rearview mirror and a user interface for a vehicle imaging system consistent with the disclosed embodiments.
Figure 3:
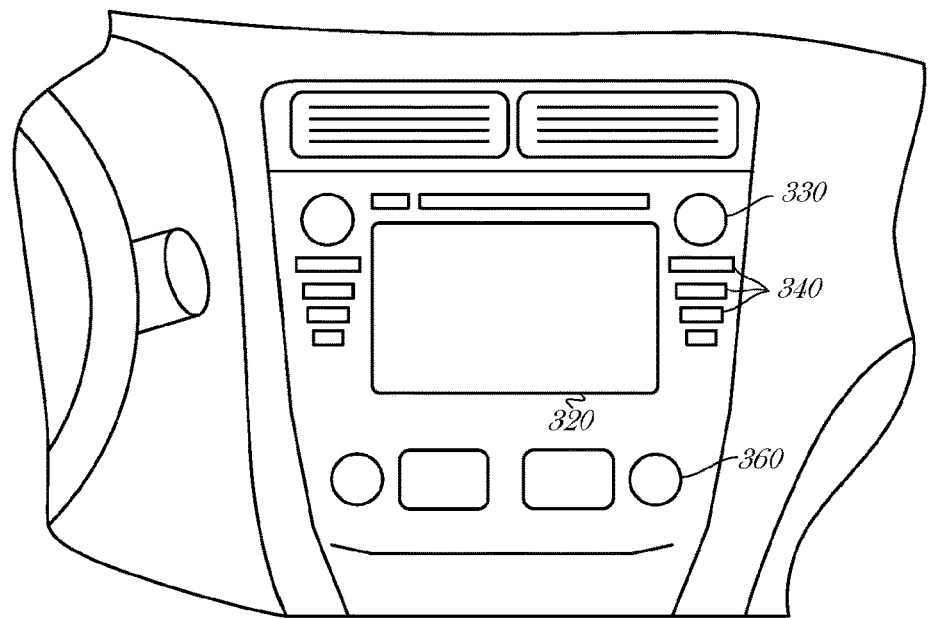

As shown in FIG. 3, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and, in response to this analysis, navigate and/or otherwise control and/or operate vehicle 200. Navigation, control, and/or operation of vehicle 200 may include enabling and/or disabling (directly or via intermediary controllers, such as the controllers mentioned above) various features, components, devices, modes, systems, and/or subsystems associated with vehicle 200. Navigation, control, and/or operation may alternately or additionally include interaction with a user, driver, passenger, passerby, and/or other vehicle or user, which may be located inside or outside vehicle 200, for example by providing visual, audio, haptic, and/or other sensory alerts and/or indications.

As discussed below in further detail and consistent with various disclosed embodiments, system 100 may provide a variety of features related to autonomous driving, semi-autonomous driving and/or driver assist technology.

For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. It would be appreciated that in some cases, the actions taken automatically by the vehicle are under human supervision, and the ability of the human to intervene adjust abort or override the machine action is enabled under certain circumstances or at all times. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings, indications, recommendations, alerts, or instructions to a driver, passenger, user, or other person inside or outside of the vehicle (or to other vehicles) based on the analysis of the collected data. Additional details regarding the various embodiments that are provided by system 100 are provided below.

The following terms and mathematical or textual expressions are used in the following text and drawings. It should be noted that the terms may be represented by other mathematical or textual expressions. For example, a second part of a message signature may be generated in various manners, and $HMAC_K$ is merely an example of said second part. Other expressions may be used to represent other techniques for generating said second part.

Message (M).
Message signature (S).
First part (V) of a message signature.
Second part ($HMAC_K(M)$).
Secret key (K).
First member secrets ($a_j^x$). Also referred to as first intermediate matrix elements.
Second member secrets ($b_j^x$). Also referred to as second intermediate matrix elements.
Random vector ($L_j$).
First group of secrets (Ai).
Second group of secrets (Bi).
Random vectors ($V_j^x(i)$) allocated to an entitled member.
First product ($\Pi_{j=1}^m (a_j^x)^{L_j}$).
First factors (($a_j^x)^{L_j}$).
Second product ($\Pi_{j=1}^m (b_j^x)^{L_j}$).
Second factor (($b_j^x)^{L_j}$).
First base $a_j^x$.
First intermediate product ($\Pi_{i=1}^n A_i^{V_j^x(i)}$).
First intermediate factors ($A_i^{V_j^x(i)}$).
Second intermediate product ($\Pi_{i=1}^n B_i^{V_j^x(i)}$).
Second intermediate factors ($B_i^{V_j^x(i)}$).
Validation secret key (K').
First validation product ($\Pi_{i=1}^n A_i^{V_i}$).
First validation factors ($A_i^{V_i}$).
Second validation product ($\Pi_{i=1}^n B_i^{V_i}$).
Second validation factors ($B_i^{V_i}$).
Validation intermediate result $H' = HMAC_{K'}(M)$.
Member secrets ($C_j^x$).
Random matrix ($E^x$).
Inverse ($Ex^{-1}$) of the random matrix.
Intermediate matrix $$\left( \begin{pmatrix} a_j^x & 0 \\ 0 & b_j^x \end{pmatrix} \right).$$

Third matrix ($\Pi_{j=1}^m (C_j^x)^{L_j}$).
Factor matrixes (($C_j^x)^{L_j}$).
Third intermediate matrix ($C_j^x$).
Other intermediate matrixes $$\left( \begin{pmatrix} A_j^x & 0 \\ 0 & B_j^x \end{pmatrix} \right).$$

Many services and applications are based on a collection of data by a collection unit (also referred to as a collection device) from entitled members. The collection unit may be a computerized system, or may include one or more computerized systems, one or more computerized subsystems, and the like. The collection unit may include a communication circuit to send and receive data from vehicles, sensors, or other data producers. For example, road mapping applications or traffic control applications collect data from many vehicles and generate maps, traffic load estimates, and the like. The collection unit may also include a processor or multiple processors to execute instructions to perform the methods and processes described here.

An entitled member is a member that is entitled to provide data. A member may become an entitled member by applying any authentication and/or registration and/or other process.

An entitled member may be any type of data producing device, including a vehicle, a roadside unit, a sensor device, a monitoring device, or other such device. The data provided by an entitled member may relate to traffic, road conditions, or to any other content.

The collection entity may gather information from multiple members all belonging to a group of entitled members. The collection unit is configured to collect only information sent from valid entitled members of the group.

Figure 4:
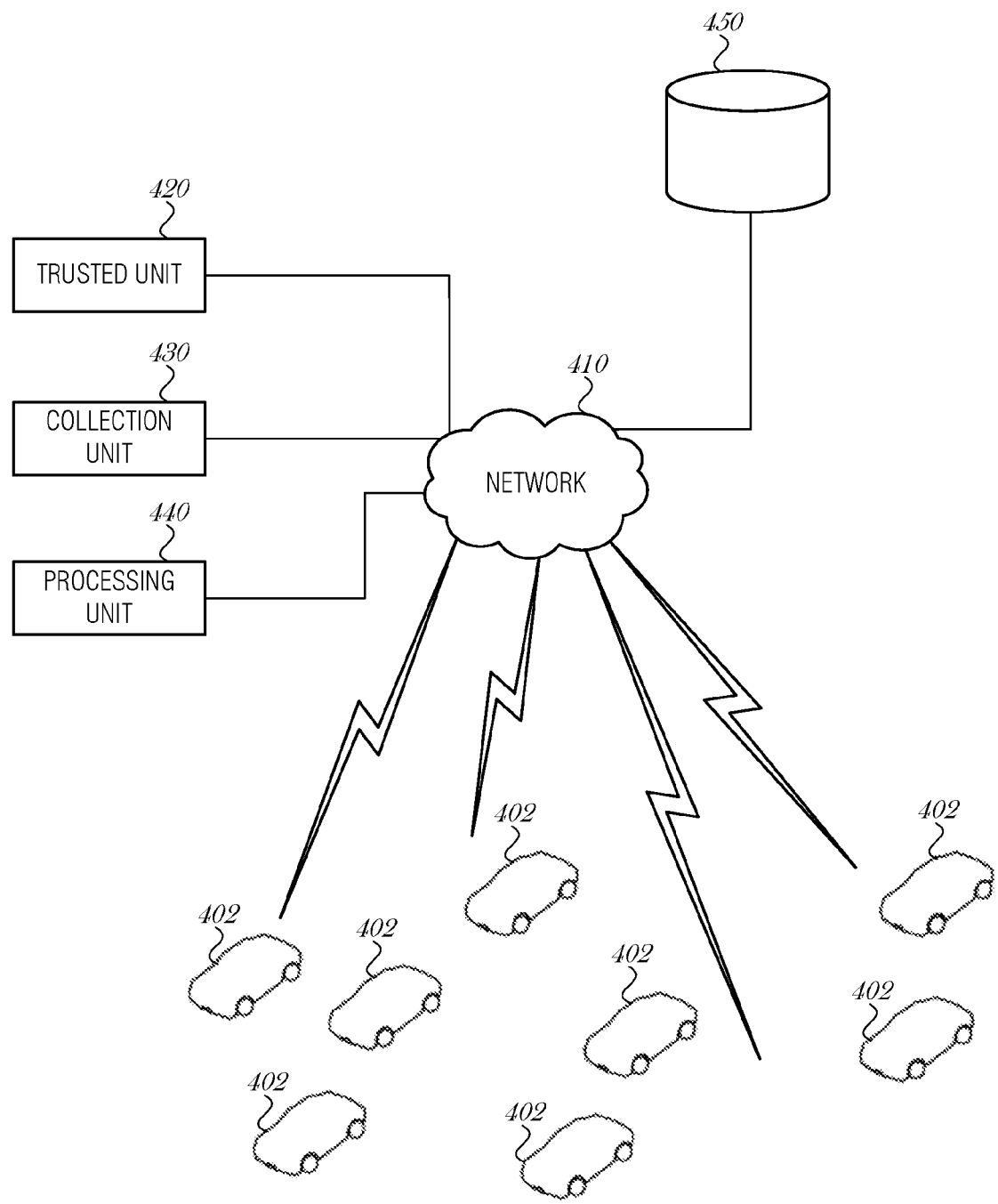
FIG. 4 illustrates an example of a system and multiple enabled members.

FIG. 4 illustrates an example of a system and multiple entitled members. FIG. 4 includes a trusted unit 420, collection unit 430, processing unit 440, network 410, database 450, and entitled members such as vehicles 402.

The trusted unit 420, collection unit 430, and processing unit 440 may include or be implemented using one or more computers. The trusted unit 420 may be trusted in the sense that it may generate and save secrets in a secure manner. The trusted unit 420 may be implemented using a secure enclave, trusted execution environment (TEE), or other hardened secured device. The trusted unit 420 may be isolated from the collection unit 430 and the processing unit 440 using various methods. For instance, while random access memory devices may be shared between the trusted unit 420 and other units (collection unit 430 or processing unit 440), the areas of the memory device used by the trusted unit 420 are encrypted.

The collection unit 430 is configured to collect data from the entitled members and validate that data is indeed sent from an entitled member. Processing unit 440 may process the data from the entitled members (e.g., generate a map) and store the outcome of the processing in database 450. Processing unit 440 may be implemented using a processor, application specific integrated circuit (ASIC), field programmable gate array (FPGA), or any other programmable device or device that is designed and hardwired to perform the functions described herein.

Anonymity is guaranteed for entitled members. The collection unit 430 is unable to trace back the identity of the sending entrusted member. Further, the collection unit 430 is unable to determine whether two messages originated from the same source. That is, the scheme preserves anonymity of a given source. The security of the scheme relies on an assumption that one cannot collect sequences of signatures all generated by the same group member.

The scheme also provides user identity unveiling in certain special circumstances. For example, upon certain special circumstances, e.g., a member's violation of use rules, it is possible to trace back to discover the identity of a message originator. This capability is provided by introducing a trusted party who knows the secrets of all the scheme's players and the identities of the group members they were distributed to. This trusted party will also generate the secrets used by the scheme. In the environment illustrated in FIG. 4, this trusted party is embodied in the trusted unit 420.

The scheme may provide additional security requirements, such as Non Impersonation and Traitor Tracing.

For non-impersonation, a policy may be implemented where one entitled member is not able to impersonate another entitled member. In general, a coalition of a reasonable size of valid entitled group members cannot impersonate as another valid group member outside of the coalition. That is, they are not capable of generating a message and a signature that when given to the trusted party, will cause the trusted party to act as if the message was received by a group member outside of the coalition.

Another policy is to provide traitor tracing. In general, traitor tracing is where a coalition of valid group members (traitors) may generate a new fake group member such that the new fake member can create signatures that are accepted by the collection unit. It is required that once a reasonable size of coalition of traitors generated a fake signature, the trusted party is capable to use the fake signature to trace back to the identities of the traitors.

There is provided a method, system, and a computer readable medium to implement a scheme for anonymous collection of data from entitled members.

The presentation of the proposed scheme ("First Scheme") may employ finite field $F_p$, all algebraic operations may be performed over this field. The number p (number of bits in the finite field that represent members) should be long, for example, at least 160 bits. A variant of the scheme is also presented as the "Second Scheme". The Second Scheme is immune against coalitions of traitors that try to create fake identities and present a fake signature. This Second Scheme works over the ring of numbers modulo N where N is a product of two large primes and the factorization of N into its prime factors is hard. The scheme may be symmetric.

First Scheme

In general, to implement a scheme for anonymous data collection, several operations are used. In the first operation, secrets are generated. These secrets are stored in the trusted unit. In the second operation, a signature for a message is generated by a group member. This signature is transmitted with the message to the collection unit. In the third operation, the collection unit verifies the signature. This is discussed further in FIGS. 5-7.

Figure 5:
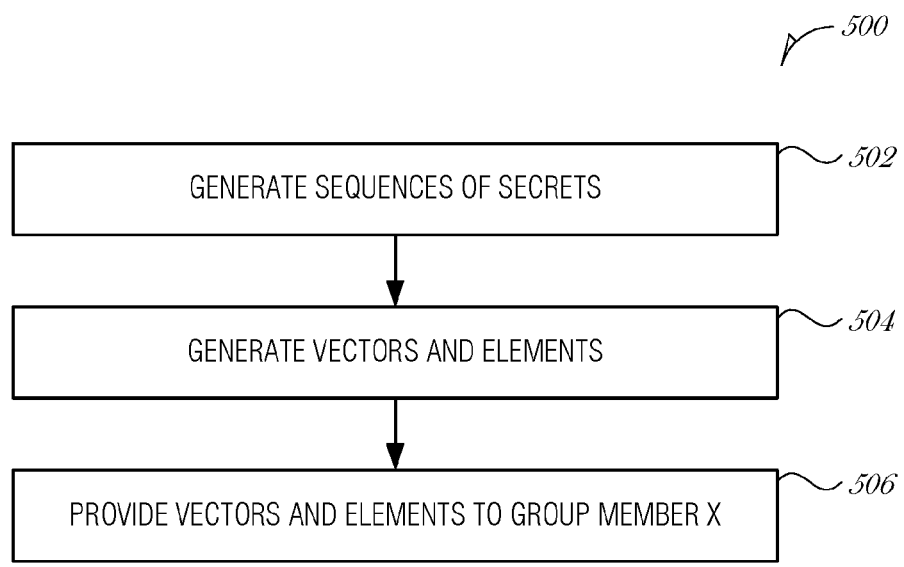
FIG. 5 is a flowchart illustrating a method for generating secrets, according to an embodiment.

FIG. 5 is a flowchart illustrating a method 500 for generating secrets, according to an embodiment. At 502, the trusted party may generate two or more sequences of secrets $\{A_1, \ldots, A_n\}$ and $\{B_1, \ldots, B_p\}$ such that $A_i, B_j \in \{1, \ldots, p-1\}$, where p is the size of the field F, and where the size of n is larger than 100 and may be in the quantity of several hundreds. These two sequences of secrets are given to the collection unit to be used for signature verification of group members.

At 504, for each entitled group member x, the trusted party generates m vectors $V_1^x, \ldots, V_m^x$, where the size of m is greater than twenty (e.g., several dozen), and where each vector $V_j^x$ is a vector of n small valued integers, such that $|V_j^x(i)| \leq D_1$ for small value $D_1$ and the values $V_j^x(i)$ are randomly selected from the range $[-D_1, D_1]$.

Along with each vector $V_j^x$ two secrets are generated using the formulas:

$$a_j^x = \prod_{i=1}^n A_i^{V_j^x(i)} \mod p$$

$$b_j^x = \prod_{i=1}^n B_i^{V_j^x(i)} \mod p$$

At 506, these secrets—the vectors $V_j^x$ and the elements $a_j^x, b_j^x$ for $1 \leq j \leq m$—are given to group member x.

Figure 6:
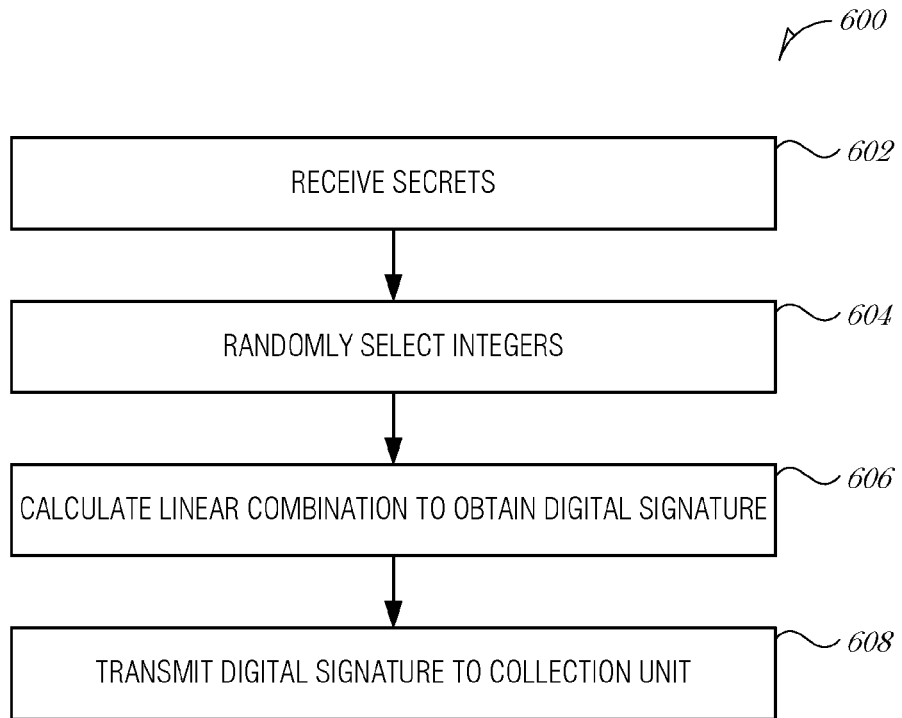
FIG. 6 is a flowchart illustrating a method for generating a signature for a message by a group member, according to an embodiment.

FIG. 6 is a flowchart illustrating a method 600 for generating a signature for a message by a group member, according to an embodiment At 602, an entitled group member may receive the secrets generated by method 500, that is, $V_j^x$ and the elements $a_j^x$, $b_j^x$ for $1 \leq j \leq m$.

At 604, the group member x randomly selects m small integer values $L_j$ from the range $[-D_2, D_2]$ such that not all $L_j$ are 0.

At 606, the group member calculates the linear combination: $V = \sum_{j=1}^{m} L_j \cdot V_j^x$ and the value: $K = \prod_{j=1}^{m}(a_j^x)^{L_j} + \prod_{j=1}^{m}(b_j^x)^{L_j}$. K is used as a secret key for a standard symmetric digital signature of the message M, for example, HMAC. Any other method for generating the secret key (other than HMAC) may be used. As a result, the digital signature S is the pair: $(V, HMAC_K(M))$.

At 608, the digital signature S is sent to the collection unit.

Figure 7:
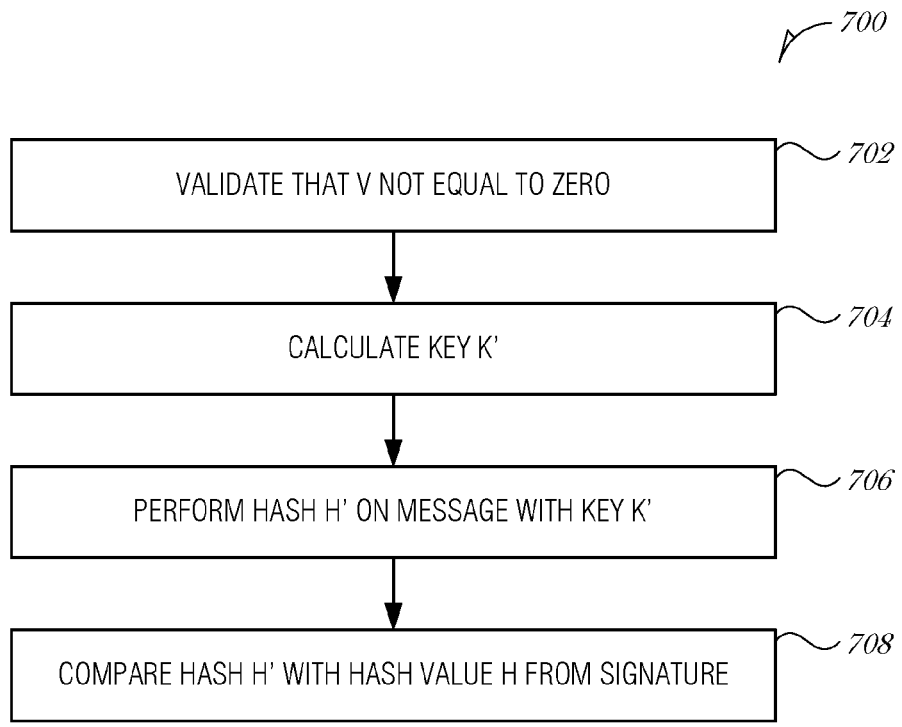
FIG. 7 is a flowchart illustrating a method for verifying a signature for a message, according to an embodiment.

FIG. 7 is a flowchart illustrating a method 700 for verifying a signature for a message, according to an embodiment. The signature may be verified by the collection unit. The collection unit receives the message M and the signature $(V, HMAC_K(M))$. Verification of the signature is carried by the following steps.

At 702, the collection unit validates that $V \neq 0$. If $V=0$, then the signature is invalid and is rejected.

At 704, the collection unit calculates the key K' using the equation $$K' = \prod_{i=1}^{n} A_i^{V_i} + \prod_{i=1}^{n} B_i^{V_i} \bmod p.$$

At 706, the collection unit performs the hash with the key K' on the message M. In particular, the collection unit calculates $H' = HMAC_{K'}(M)$.

At 708, a comparison is made between the generated hash H' and the hash value $HMAC_K(M)$ sent in the signature S. If the signature if $H' = HMAC_K(M)$, then it is accepted. Otherwise, the signature is rejected. One can validate according to the definitions of V, $a_j^x$, $b_j^x$, K that a valid signature for a message M implies K'=K, thus the signature is accepted.

The signature scheme is secure. To prove that a signature scheme is secure one should show that an adversary who sees k valid signatures $S_1, \ldots, S_k$ for messages $M_1, \ldots, M_k$ cannot produce valid signature for message M' $\{M_1, \ldots, M_k\}$. Assuming one produces a valid signature for new message M' i.e., pair (V'', $HMAC_{K''}(M')$), the security assumption for the HMAC scheme implies it cannot be done without knowledge of K'', that is the adversary would need to know the value $K'' = \prod_{i=1}^{n} A_i^{V''_i} + \prod_{i=1}^{n} B_i^{V''_i} \bmod p$ for non-zero vector V''.

According to the HMAC security assumption seeing the messages $M_1, \ldots, M_k$ and their signatures $S_1, \ldots, S_k$ gives the adversary no information about the keys used for calculating their HMAC signatures. The Hardness assumption is that even given then values $K_1, \ldots, K_k$ for the corresponding vectors $V_1, \ldots, V_k$ for unknown values $A_1, \ldots, A_n$ and $B_1, \ldots, B_n$ it is hard to deduce K'' for new vector V''.

Additionally, the scheme provides anonymity of the signer. A signature of a message M may include of a pair $(V, HMAC_K(M))$, where the value $HMAC_K(M)$ cannot be distinguished from a random string unless K is known. Thus, one who does not know K cannot differentiate between signatures of different group members using only $HMAC_K(M)$.

The key K is derived from the secrets $\{A_1, \ldots, A_n\}$ and $\{B_1, \ldots, B_n\}$ using V. However, deducing any information about K produced by a new vector V is considered a hard problem (even if some oracle reveals polynomially many values $\{K_i\}_{i \in I}$ for corresponding vectors $\{V_i\}_{i \in I}$). Saying all that, the only information available for an adversary for distinguishing signed message of one group member from another group member is the vector V. The message's content is not considered valid information for this task as one can encrypt the message.

Recall the vector V is generated by a group member x as a linear combination of the secret vectors $V_1^x, \ldots, V_m^x$ with small integer coefficient $L_j$, resulting in $$V = \sum_{j=1}^{m} L_j \cdot V_j^x.$$

The collection unit and an observer of the communication do not have any information about the vector sets $\{V_j^x\}_{j=1 \ldots m}$ or which vector set was given to which group member. For them the vector V looks like a random vector of small n integer values. As matter of fact, even if up to m-V vectors are produced by the same group member, one cannot distinguish them from random m small integer values vectors. However, if m+1-V vectors are produced by the same group member, it is possible to distinguish them from m+1 random small valued vectors since the (m+1)×n matrix formed by these m+1 line vectors has only rank m where random set of m+1 vectors has rank m+1, with m<n.

The anonymity feature of the scheme for certain group member x breaks once the collection unit (or an observer) knows m vectors V produced by x. Thus, anonymity holds in correlation with the security assumption that it is hard to collect a set of m V vectors produced by the same group member.

In a real situation, a group member's anonymity should be preserved regardless of the number signatures it has generated or that have been collected by the adversary. This requirement is satisfied in the following scenarios:

a. The observed traffic of messages with their corresponding signatures is generated by several group members. An adversary who collects the signatures cannot partition them into groups of messages coming from the same group member.

b. Each group member owns several instances of the signature scheme, each one with different parameters. Whenever it wishes to sign a message, it randomly selects one of the signature schemes to sign with.

Both scenarios guarantee that messages with signatures generated by the same scheme are randomly mixed among other messages.

The anonymity argument depends on the following assumption: selecting a subset of signatures generated by the same scheme from a larger set of signatures is a hard problem (in terms of nondeterministic polynomial time).

The only information an adversary can use in order to reveal the identity of a signer is a set of vectors $C = \{V_1, \ldots, V_k\}$; $V_i \in Z^n$. The adversary would have to find a subset $D \subseteq C$ of at least m+1 vectors such that the subspace spanned by the vectors in D has dimension less or equal m.

There are algorithms that solve this problem; however, they require that the number of signing schemes involved is small, or m is small. In our case, use of a large m and the number of schemes involved should be large enough to make solving for the identity of the signer.

There are some circumstances where the identity of a group member who generated a message with a corresponding signature must be revealed. This unveiling of the signer's identity can be done with the help of the trusted party who knows for each user x the set of vectors $V_1^x, \ldots, V_m^x$.

The signature is of the form $(V, HMAC_K(M))$ and the vector V is a linear combination of the vectors $V_1^x, \ldots, V_m^x$ for some x. One can check for all possible x whether $V \in \text{span}\{V_1^x, \ldots, V_m^x\}$ using a Gauss elimination algorithm. The identity x is most likely unique. For random vectors $V_1^x, \ldots, V_m^x$ and $V_1^{x'}, \ldots, V_m^{x'}$, we have span $\{V_1^x, \ldots, V_m^x\} \cap \text{span}\{V_1^{x'}, \ldots, V_m^{x'}\} = \{0\}$ as long as: $m < n/2$.

This process can be made much faster as we partition the group members into n supergroups of almost equal size, and require that for every supergroup y there is a vector $W^y \in Z^n$, for each $x \in y$ and $1 \le i \le m <V_i^x, W^y> = 0$ mod p. That is, the scalar product of all the $V_i^x$ with $W^y$ equal 0 modulo p.

Saying that, the tracing is done as follows:
a. Find y such that $<V, W^y> = 0$ mod p
b. Find $x \in y$ such that $V \in \text{span}\{V_1^x, \ldots, V_m^x\}$ If we choose this approach, then generation of the vectors $\{V_1^x, \ldots, V_m^x\}$ for $x \in y$ is more complex and requires using a lattice reduction algorithm.

A coalition of traitors refers to a scenario in which one has two (or more) schemes, that is a given group member has the secrets of group member x: $V_j^x$ and $a_j^x, b_j^x$ for $1 \le j \le m$ and the secrets of group member x': $V_j^{x'}$ and $a_j^{x'}, b_j^{x'}$ for $1 \le j \le m$. The given group member may create a new fake identity z as follows:

For each $1 \le j \le m$, select 2m small integer values $t_{j,i}$ for $1 \le i \le 2m$:

$$V_j^z = \sum_{i=1}^{m} t_{j,i} V_j^x + \sum_{i=m+1}^{2m} t_{j,i} V_j^{x'}$$

$$a_j^z = \prod_{i=1}^{m} (a_i^x)^{t_{j,i}} \cdot \prod_{i=m+1}^{2m} (a_i^{x'})^{t_{j,i}}$$

$$b_j^z = \prod_{i=1}^{m} (b_i^x)^{t_{j,i}} \cdot \prod_{i=m+1}^{2m} (b_i^{x'})^{t_{j,i}}.$$

Second Scheme

There may be provided a scheme that provides security against traitors who are trying to generate a new fake identity. The algebraic operations in this scheme are performed over the ring of integers modulo large number N which is a product of two secret large prime numbers P and Q, such that $N = P \cdot Q$.

Factorization of N into its prime factors is assumed to be nondeterministic hard problem. As explained in the previous section several group members can collide and use their secrets for generation of a new set of secrets. This is enabled as one can multiply the secret terms: $a_j^x, a_i^{x'}$ and $b_j^x, b_i^{x'}$ belonging to any two identities x and x'.

The new construction enables calculation of the key K (depends on a vector V), However combining secrets of two different group members is as hard as factoring N into its prime factors.

As with the First Scheme, to implement the Second Scheme for anonymous data collection, several operations are used. In the first operation, secrets are generated. These secrets are stored in the trusted unit. In the second operation, a signature for a message is generated by a group member. This signature is transmitted with the message to the collection unit. In the third operation, the collection unit verifies the signature. This is discussed further in FIGS. 8-9.

Figure 8:
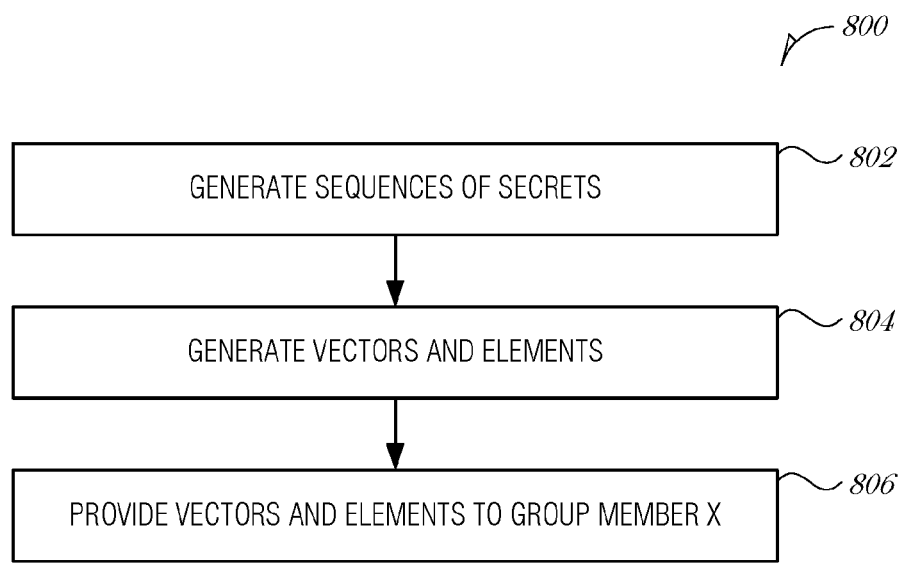
FIG. 8 is a flowchart illustrating a method for generating secrets, according to an embodiment.

FIG. 8 is a flowchart illustrating a method 800 for generating secrets, according to an embodiment. At 802, a trusted party generates two sequences of secrets $\{A_1, \ldots, A_n\}$ and $\{B_1, \ldots, B_n\}$ such that $A_i, B_j \in \{1, \ldots, N-1\}$, where N is the product of two secret large prime numbers P and Q, and the size of n is larger than 100 and may be as large as several hundreds. These two sequences of secrets are given to the collection unit to be used for signature verification of group members.

At 804, for each entitled group member x, the trusted party generates m vectors $V_1^x, \ldots, V_m^x$, where the size of m is close to n and it can even be n-1. Each vector $V_j^x$ is a vector of n small value integers, such that $|V_j^x(i)| \le D_1$ for small value $D_1$. The values $V_j^x(i)$ are randomly selected from the range $[-D_1, D_1]$.

Along with each vector $V_j^x$ two secrets a and b are generated, where $a_j^x = \prod_{i=1}^{n} A_i^{V_j^x(i)}$ mod N and $b_j^x = \prod_{i=1}^{n} B_i^{V_j^x(i)}$ mod N.

In addition a random 2×2 matrix $E^x$ is selected, and the following set of m matrices $$C_j^x = E^x \begin{pmatrix} a_j^x & 0 \\ 0 & b_j^x \end{pmatrix} E^{x-1}$$

is calculated.

At 806, each group member x is given the vectors $V_j^x$ and the matrices $C_j^x$ for $1 \le j \le m$.

Figure 9:
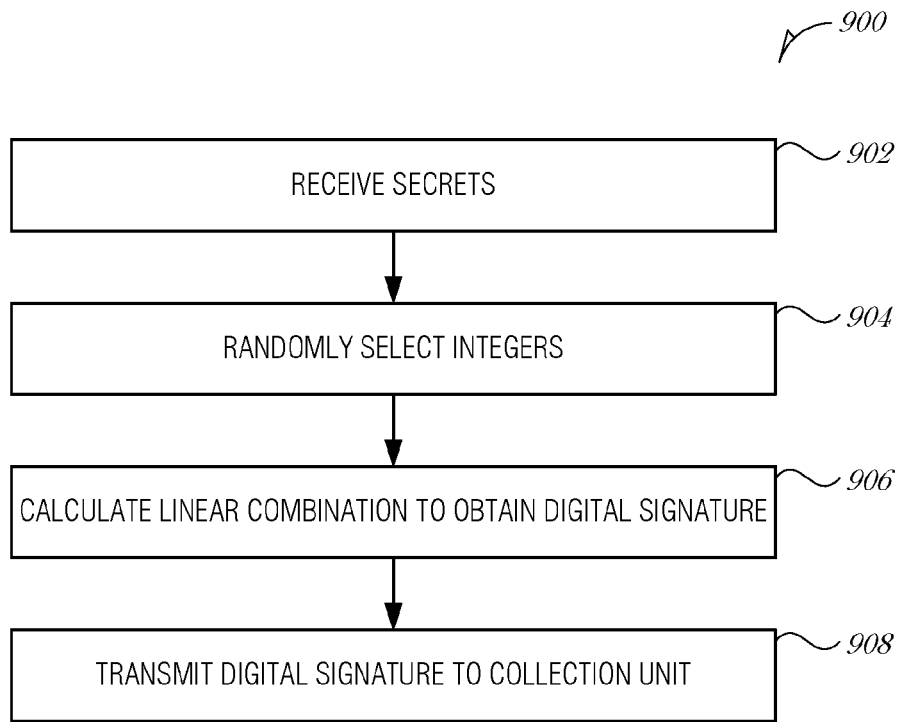
FIG. 9 is a flowchart illustrating a method for generating a signature for a message by a group member, according to an embodiment.

FIG. 9 is a flowchart illustrating a method 900 for generating a signature for a message by a group member, according to an embodiment. At 902, the entitled member x may receive $V_j^x$ and the elements $a_j^x, b_j^x$ for $1 \le j \le m$.

At 904, the group member x randomly selects m small integer values $L_j$ from the range $[-D_2, D_2]$ such that not all $L_j$ are 0.

At 906, the group member calculates the following linear combination:

$$V = \sum_{j=1}^{m} L_j \cdot V_j^x$$

and the value: $K = \text{trace}(\prod_{j=1}^{m}(C_j^x)^{L_j})$. The trace of a matrix is the sum of the elements on the diagonal. K is used as a secret key for a standard symmetric digital signature of the message M, for example HMAC. Any other method for generating the secret key (other than HMAC) may be used.

The digital signature S is the pair: $(V, \text{HMAC}_K(M))$.

At 906, the digital signature is sent to the collection unit with the message.

Figure 10:
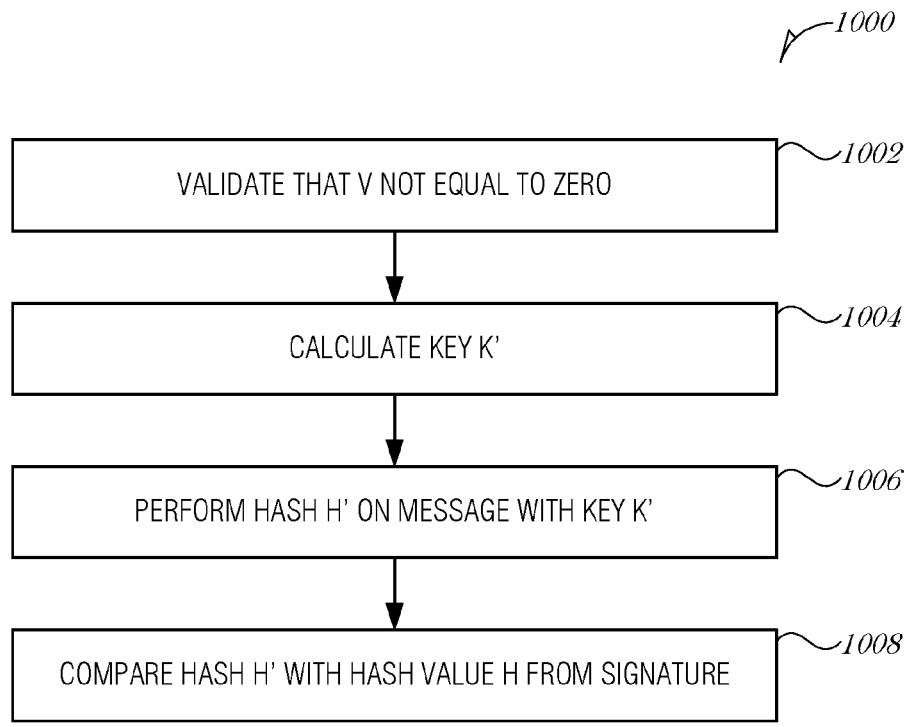
FIG. 10 is a flowchart illustrating a method for verifying a signature for a message, according to an embodiment.

FIG. 10 is a flowchart illustrating a method 1000 for verifying a signature for a message, according to an embodiment.

The signature may be verified by the collection unit. The collection unit receives the message M and the signature $(V, \text{HMAC}_K(M))$. Verification of the signature is carried by the following steps.

At 1002, the collection unit validates that $V \ne 0$. If $V = 0$, then the signature is invalid and is rejected.

At 1004, the collection unit calculates the key K'. This may be performed similarly to how key K' is calculated in operation 704, discussed above.

It should be noted that the two methods of generating K produce the same value. That is $K = \prod_{j=1}^{m}(a_j^x)^{L_j} + \prod_{j=1}^{m}(b_j^x)^{L_j}$ (from operation 606) and $K = \text{trace}(\prod_{j=1}^{m}(C_j^x)^{L_j})$ (from operation 906) produce the same value for K. As such, the calculation of K' for verification can be the same for both schemes.

Thus, these two methods produce the same value for K, however in the first version a coalition of dishonest users are capable of producing a new valid identity that cannot be traced if required, while in the second version a coalition of dishonest users cannot use their secret matrices in order to generate new identity. This is because every user has its secret matrices encoded in a different subspace of matrices, and if one can combine matrices from different subspaces together to form a new identity, then he can factor N to its prime factors which is regarded as hard problem. One can see that the actual value K calculated by both schemes is identical, this is why the verification is carried by the central unit the same way for both versions.

At 1006, the collection unit performs the hash with the key K' on the message M. In particular, the collection unit calculates H'=HMAC$_{K'}$(M).

At 1008, a comparison is made between the generated hash H' and the hash value HMAC$_K$(M) sent in the signature S. If the signature if H'=HMAC$_K$(M), then it is accepted. Otherwise, the signature is rejected. One can validate according to the definitions of V, $a_j^x$, $b_j^x$, K that a valid signature for a message M implies K'=K, thus the signature is accepted.

The same aspects of security apply for the variant scheme (i.e., Second Scheme), as with the First Scheme. Similarly, aspects of anonymity apply for the variant scheme. Here, the anonymity aspect is even better than the previous scheme once we take m=n−1; however, we do require the signatures to come from several group members such that one cannot partition them according to their origin. In case this requirement does not hold, there is a second requirement that each group member is to use a random key set selected from its group of keys whenever a message is to be signed. For m=n−1 and for n of the size of several hundreds, 7-8 sets of keys per group member provide good anonymity.

The Second Scheme also provides a mechanism to unveil the signer's identity. For the purpose of identifying the identity of sender of a message, the trusted unit stores for each group member x a vector $W^x \in Z^n$ satisfying: $<V_i^x, W^x> = 0 \mod N$ for all $1 \leq i \leq m$. When the identity of sender of a message is to be traced, the trusted unit extracts the vector V out of the signature and checks against every identity y whether $<V, W^y> = 0$.

In the scenario of a coalition of traitors, a fake identity is constructed using secrets of at least two group members x and x' and introducing a method for calculating $\alpha = \Pi_{i=1}^m (a_i^x)^{t_i} \cdot \Pi_{i=1}^m (a_i^{x'})^{t'_i} + \Pi_{i=1}^m (b_i^x)^{t_i} \cdot \Pi_{i=1}^m (b_i^{x'})^{t'_i}$ for some non-zero integer vectors $T=(t_1, \ldots, t_m)$ and $T'=(t'_1, \ldots, t'_m)$.

The secrets matrices of x are: $C_1^x, \ldots, C_m^x$, and the secrets matrices of x' are: $C_1^{x'}, \ldots, C_m^{x'}$.

Define the matrices: $C^x = \Pi_{i=1}^m (C_i^x)^{t_i}$ and $C^{x^T} = \Pi_{i=1}^m (C_i^{x'})^{t'_i}$.

Being able of calculating $\alpha$ implies that one can embed the linear subspace of matrices generated by $\{C^{x^T}, I\}$ into the linear subspace of matrices generated by $\{C^{x^T}, I\}$ and this embedding preserves the characteristic polynomial of the input matrix.

It can be shown that if one can build such an embedding between these subspaces of matrices then he can factor N. This result implies the hardness of faking an identity using a coalition of traitors.

Figure 11:
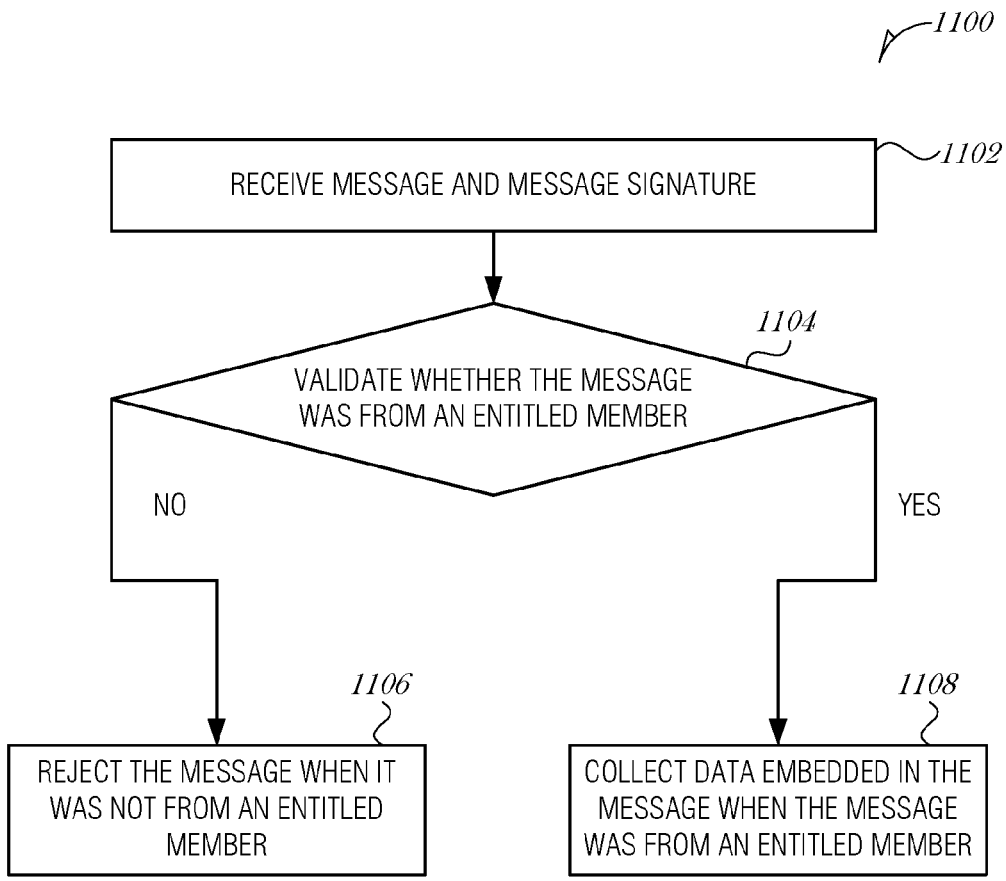
FIG. 11 is an example of method that is executed by a collection unit, to implement the first scheme, according to an embodiment.

FIG. 11 is an example of method 1100 that is executed by a collection unit, to implement the first scheme, according to an embodiment. The method 1100 is for collecting data from a group of entitled members.

At 1102, a message and a message signature are received by a collection unit. A message signature received from the entitled member comprises a first part, and a second part. The second part is generated using a secret key. The secret key is calculated by applying a first plurality of mathematical operations on first member secrets allocated to the entitled member, second member secrets allocated to the entitled member, and a random vector.

At 1104, the collection unit validates whether the message was received from one of the entitled members of the group, without identifying an entitled member that sent the message, where the validating comprises applying a second plurality of mathematical operations on a first group of secrets, a second group of secrets and a first part of the message signature.

The first plurality of mathematical operations comprises calculation of products of multiplications of factors that have bases and random exponents. The first member secrets are calculated based on secrets of the first group of secrets allocated to the group, and a subset of random vectors allocated to the entitled member. The second member secrets are calculated based on secrets of the second group of secrets allocated to the group, and the subset of random vectors allocated to the entitled member. The first member secrets and the second member secrets are calculated by applying a modulo operation and additional operations. The collection unit has access to the first group of secrets and the second group of secrets but is unaware of an allocation of first member secrets and second member secrets to the entitled members of the group.

At 1106, the message is rejected by the collection unit when the message was not received from any entitled member of the group.

At 1108, data embedded in the message is collected when the message was received from one of the entitled members of the group.

In an embodiment, the secret key is a function of a first product of a multiplication of first factors, and a second product of a multiplication of second factors. In a further embodiment, each first factor has a first base that is calculated by applying a modulo operation (mod p) on a first intermediate product of a multiplication of first intermediate factors. In a further embodiment, each second factor as a second base that is calculated by applying the modulo operation on a second intermediate product of a multiplication of second intermediate factors.

In another embodiment, a first intermediate factor has a base that is a secret from the first group of secrets and has a random exponent which is an element of the subset of random vectors allocated to the entitled member; and a second intermediate factor has a base that is a secret from the second group of secrets and has a random exponent which is an element of the subset of random vectors allocated to the entitled member.

In an embodiment, the validating comprises calculating, by the collection unit, a validation secret key as a function of the first group of secrets, the second group of secrets, and the first part of the message signature. In a further embodiment, the validating comprises applying a modulo operation on a first validation product of a multiplication of first validation factors, and applying the modulo operation on a second validation product of a multiplication of second validation factors.

In an embodiment, different first validation factors have bases that are different secrets from the first group of secrets and different random exponents. In such an embodiment, different second validation factors have bases that are different secrets from the second group of secrets and the different random exponents, and the different random exponents belong to the second part of the message signature. In a further embodiment, the second part of the message signature is generated using a cryptographic process, where the validation comprises applying the cryptographic process, using the validation secret key, to provide a validation intermediate result. In a further embodiment, the validating comprises comparing the validation intermediate result to the second part of the signature message; and determining that the message was received from any one of the entitled members of the group when the first part of the message signature is nonzero, and the validation intermediate result equals the second part of the signature message.

In an embodiment, the first plurality of mathematical operations are calculated over a finite field having a predefined size (p), wherein the modulo operation has a divisor that equals the predefined size.

In an embodiment, the collected data may be further processed by a processing unit.

Figure 12:
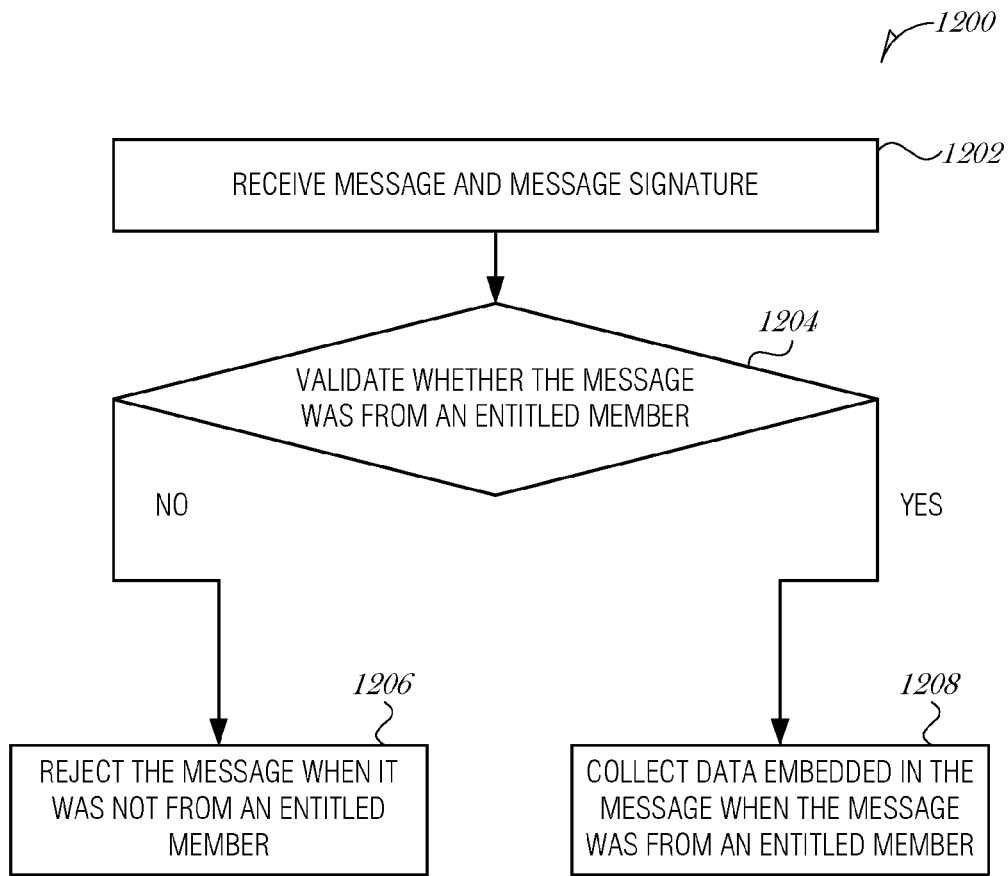
FIG. 12 is an example of method that is executed by a collection unit, to implement the second scheme, according to an embodiment.

FIG. 12 is an example of method 1200 that is executed by a collection unit, to implement the second scheme, according to an embodiment. The method 1200 is for collecting data from a group of entitled members.

At 1202, a message and a message signature are received by a collection unit. The message signature received from an entitled member comprises a first part, and a second part. The second part is generated using a secret key. The secret key is calculated by applying a first plurality of mathematical operations on member secrets allocated to the entitled member, and a random vector.

At 1204, the collection unit validates whether the message was received from one of the entitled members of the group, without identifying the entitled member that sent the message, where the validating comprises applying a second plurality of mathematical operations on a first group of secrets, a second group of secrets, and a first part of the message signature.

The first plurality of mathematical operations comprises a modulo operation, and calculation of products of multiplications of factors that have bases and random exponents. The member secrets are calculated based on secrets from the first group of secrets allocated to the group, a second group of secrets allocated to the group, a random matrix, and a subset of random vectors allocated to the entitled member. The collection unit has access to the first group of secrets and the second group of secrets but is unaware of an allocation of member secrets to the entitled members of the group.

At 1206, the collection unit rejects the message when the message was not received from any entitled member of the group.

At 1208, data embedded in the message is collected when the message was received from one of the entitled members of the group.

In an embodiment, the secret key is a function of a set of matrixes, wherein different matrixes of the set are a function of the random matrix, an inverse of the random matrix, and an intermediate matrix that comprise first intermediate matrix elements, and second intermediate matrix elements. In a further embodiment, the first intermediate matrix elements are first intermediate products of a multiplication of first intermediate factors; and wherein the second intermediate matrix elements are second intermediate product of a multiplication of second intermediate factors.

In an embodiment, a first intermediate factor has a base that is a secret from the first group of secrets and has a random exponent which is an element of the subset of random vectors allocated to the entitled member and a second intermediate factor has a base that is a secret from the second group of secrets and has a random exponent which is an element of the subset of random vectors ($V_j^x(i)$) allocated to the entitled member.

In an embodiment, the intermediate matrixes are diagonal matrixes and the secret key is a trace of a third matrix that is a product of multiplications of factor matrixes, each factor matrix has a random exponent and a base that is a third intermediate matrix, where different third intermediate matrixes are products of multiplying the random matrix by different intermediate matrixes and by the inverse of the random matrix.

For example, any of method describing steps may include more steps than those illustrated in the figure, only the steps illustrated in the figure or substantially only the steps illustrate in the figure. The same applies to components of a device, processor, or system and to instructions stored in any non-transitory computer readable storage medium.

The embodiments disclosed herein may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program includes instructions to execute a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input and responds by allocating and managing tasks and internal system resources as a service to users and programs of the system.

The computer system may for instance include at least one processing unit, associated memory, and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units, or devices, for example via intermediate devices. Accordingly, unless implied or stated otherwise, the connections may for example be direct connections or indirect connections. The connections may be illustrated or described in reference to be a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also, for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

ADDITIONAL NOTES & EXAMPLES

Example 1 is a collection device for collecting data from a group of entitled members, comprising: a communication circuit to receive a message and a message signature from an entitled member; and a hardware processor to: validate whether the message was received from one of the entitled members of the group, without identifying the entitled member that sent the message, wherein the validating comprises applying a second plurality of mathematical operations on a first group of secrets, a second group of secrets, and a first part of the message signature; reject the message when the message was not received from any entitled member of the group; and collect data embedded in the message when the message was received from one of the entitled members of the group; wherein a message signature received from an entitled member comprises a first part, and a second part; wherein the second part is generated using a secret key; wherein the secret key is calculated by applying a first plurality of mathematical operations on first member secrets allocated to the entitled member, second member secrets allocated to the entitled member, and a random vector; wherein the first plurality of mathematical operations comprises calculation of products of multiplications of factors that have bases and random exponents; wherein the first member secrets are calculated based on secrets from the first group of secrets allocated to the group, and a subset of random vectors allocated to the entitled member; wherein the second member secrets are calculated based on secrets from the second group of secrets allocated to the group, and the subset of random vectors allocated to the entitled member; wherein the first member secrets and the second member secrets are calculated by applying a modulo operation and additional operations; and wherein the collection device has access to the first group of secrets and the second group of secrets but is unaware of an allocation of first member secrets and second member secrets to the entitled members of the group In Example 2, the subject matter of Example 1 includes, wherein the secret key is a function of a first product of a multiplication of first factors, and a second product of a multiplication of second factors.

In Example 3, the subject matter of Example 2 includes, wherein each first factor has a first base that is calculated by applying a modulo operation (mod p) on a first intermediate product of a multiplication of first intermediate factors.

In Example 4, the subject matter of Example 3 includes, wherein each second factor as a second base that is calculated by applying the modulo operation on a second intermediate product of a multiplication of second intermediate factors.

In Example 5, the subject matter of Example 4 includes, wherein a first intermediate factor has a base that is a secret from the first group of secrets and has a random exponent which is an element of the subset of random vectors allocated to the entitled member; and wherein a second intermediate factor has a base that is a secret from the second group of secrets and has a random exponent which is an element of the subset of random vectors allocated to the entitled member.

In Example 6, the subject matter of Examples 1-5 includes, wherein the validating comprises calculating a validation secret key as a function of the first group of secrets, the second group of secrets, and the first part of the message signature.

In Example 7, the subject matter of Example 6 includes, wherein the validating comprises: applying a modulo operation on a first validation product of a multiplication of first validation factors; and applying the modulo operation on a second validation product of a multiplication of second validation factors.

In Example 8, the subject matter of Examples 1-7 includes, wherein different first validation factors have bases that are different secrets from the first group of secrets and different random exponents; wherein different second validation factors have bases that are different secrets from the second group of secrets and the different random exponents; and wherein the different random exponents belong to the second part of the message signature.

In Example 9, the subject matter of Example 8 includes, wherein the second part of the message signature is generated using a cryptographic process; wherein the validation comprises applying the cryptographic process, using the validation secret key, to provide a validation intermediate result.

In Example 10, the subject matter of Example 9 includes, wherein the validating comprises comparing the validation intermediate result to the second part of the signature message; and determining that the message was received from any one of the entitled members of the group when the first part of the message signature is nonzero, and the validation intermediate result equals the second part of the signature message.

In Example 11, the subject matter of Examples 1-10 includes, wherein the first plurality of mathematical operations are calculated over a finite field having a predefined size (p), wherein the modulo operation has a divisor that equals the predefined size.

Example 12 is a method for collecting data from a group of entitled members, the method comprising: receiving, by a collection unit, a message and a message signature; validating, by the collection unit, whether the message was received from one of the entitled members of the group, without identifying an entitled member that sent the message, wherein the validating comprises applying a second plurality of mathematical operations on a first group of secrets, a second group of secrets and a first part of the message signature; rejecting, by the collection unit, the message when the message was not received from any entitled member of the group; and collecting data embedded in the message when the message was received from one of the entitled members of the group; wherein a message signature received from the entitled member comprises a first part, and a second part; wherein the second part is generated using a secret key; wherein the secret key is calculated by applying a first plurality of mathematical operations on first member secrets allocated to the entitled member, second member secrets allocated to the entitled member, and a random vector; wherein the first plurality of mathematical operations comprises calculation of products of multiplications of factors that have bases and random exponents; wherein the first member secrets are calculated based on secrets from the first group of secrets allocated to the group, and a subset of random vectors allocated to the entitled member; wherein the second member secrets are calculated based on secrets from the second group of secrets allocated to the group, and the subset of random vectors allocated to the entitled member; wherein the first member secrets and the second member secrets are calculated by applying a modulo operation and additional operations; and wherein the collection unit has access to the first group of secrets and the second group of secrets but is unaware of an allocation of first member secrets and second member secrets to the entitled members of the group.

In Example 13, the subject matter of Example 12 includes, wherein the secret key is a function of a first product of a multiplication of first factors, and a second product of a multiplication of second factors.

In Example 14, the subject matter of Example 13 includes, wherein each first factor has a first base that is calculated by applying a modulo operation (mod p) on a first intermediate product of a multiplication of first intermediate factors.

In Example 15, the subject matter of Example 14 includes, wherein each second factor as a second base that is calculated by applying the modulo operation on a second intermediate product of a multiplication of second intermediate factors.

In Example 16, the subject matter of Example 15 includes, wherein a first intermediate factor has a base that is a secret from the first group of secrets and has a random exponent which is an element of the subset of random vectors allocated to the entitled member; and wherein a second intermediate factor has a base that is a secret from the second group of secrets and has a random exponent which is an element of the subset of random vectors allocated to the entitled member.

In Example 17, the subject matter of Examples 12-16 includes, wherein the validating comprises calculating, by the collection unit, a validation secret key as a function of the first group of secrets, the second group of secrets, and the first part of the message signature.

In Example 18, the subject matter of Example 17 includes, wherein the validating comprises: applying a modulo operation on a first validation product of a multiplication of first validation factors; and applying the modulo operation on a second validation product of a multiplication of second validation factors.

In Example 19, the subject matter of Examples 12-18 includes, wherein different first validation factors have bases that are different secrets from the first group of secrets and different random exponents; and wherein different second validation factors have bases that are different secrets from the second group of secrets and the different random exponents; wherein the different random exponents belong to the second part of the message signature.

In Example 20, the subject matter of Example 19 includes, wherein the second part of the message signature is generated using a cryptographic process; and wherein the validation comprises applying the cryptographic process, using the validation secret key, to provide a validation intermediate result.

In Example 21, the subject matter of Example 20 includes, wherein the validating comprises comparing the validation intermediate result to the second part of the signature message; and determining that the message was received from any one of the entitled members of the group when the first part of the message signature is nonzero, and the validation intermediate result equals the second part of the signature message.

In Example 22, the subject matter of Examples 12-21 includes, wherein the first plurality of mathematical operations are calculated over a finite field having a predefined size (p), wherein the modulo operation has a divisor that equals the predefined size.

Example 23 is a non-transitory computer readable medium including instructions for collecting data from a group of entitled members, which when executed by a machine, cause the machine to perform operations comprising: receiving, by a collection unit, a message and a message signature; validating, by the collection unit, whether the message was received from one of the entitled members of the group, without identifying the entitled member that sent the message, wherein the validating comprises applying a second plurality of mathematical operations on a first group of secrets, a second group of secrets, and a first part of the message signature; rejecting, by the collection unit, the message when the message was not received from any entitled member of the group; and collecting data embedded in the message when the message was received from one of the entitled members of the group; wherein a message signature received from an entitled member comprises a first part, and a second part; wherein the second part is generated using a secret key; wherein the secret key is calculated by applying a first plurality of mathematical operations on first member secrets allocated to the entitled member, second member secrets allocated to the entitled member, and a random vector; wherein the first plurality of mathematical operations comprises calculation of products of multiplications of factors that have bases and random exponents; wherein the first member secrets are calculated based on secrets from the first group of secrets allocated to the group, and a subset of random vectors allocated to the entitled member; wherein the second member secrets are calculated based on secrets from the second group of secrets allocated to the group, and the subset of random vectors allocated to the entitled member; wherein the first member secrets and the second member secrets are calculated by applying a modulo operation and additional operations; and wherein the collection unit has access to the first group of secrets and the second group of secrets but is unaware of an allocation of first member secrets and second member secrets to the entitled members of the group.

Example 24 is a collection device for collecting data from a group of entitled members, comprising: a communication circuit to receive a message and a message signature from an entitled member; and a hardware processor to: receive a message and a message signature; validate whether the message was received from one of the entitled members of the group, without identifying the entitled member that sent the message, wherein the validating comprises applying a second plurality of mathematical operations on a first group of secrets, a second group of secrets, and a first part of the message signature; reject the message when the message was not received from any entitled member of the group; and collect data embedded in the message when the message was received from one of the entitled members of the group; wherein a message signature received from an entitled member comprises a first part, and a second part; wherein the second part is generated using a secret key; wherein the secret key is calculated by applying a first plurality of mathematical operations on member secrets allocated to the entitled member, and a random vector; wherein the first plurality of mathematical operations comprises a modulo operation, and calculation of products of multiplications of factors that have bases and random exponents; wherein the member secrets are calculated based on secrets from the first group of secrets allocated to the group, secrets from the second group of secrets allocated to the group, a random matrix and a subset of random vectors allocated to the entitled member; and wherein the collection unit has access to the first group of secrets and the second group of secrets but is unaware of an allocation of member secrets to the entitled members of the group.

In Example 25, the subject matter of Example 24 includes, wherein the secret key is a function of a set of matrixes, wherein different matrixes of the set are a function of the random matrix, an inverse of the random matrix, and an intermediate matrix that comprise first intermediate matrix elements, and second intermediate matrix elements.

In Example 26, the subject matter of Example 25 includes, wherein the first intermediate matrix elements are first intermediate products of a multiplication of first intermediate factors; and wherein the second intermediate matrix elements are second intermediate product of a multiplication of second intermediate factors.

In Example 27, the subject matter of Examples 25-26 includes, wherein a first intermediate factor has a base that is a secret from the first group of secrets and has a random exponent which is an element of the subset of random vectors allocated to the entitled member; and wherein a second intermediate factor has a base that is a secret from the second group of secrets and has a random exponent which is an element of the subset of random vectors ($V_j^x(i)$) allocated to the entitled member.

In Example 28, the subject matter of Examples 25-27 includes, wherein the intermediate matrixes are diagonal matrixes and wherein the secret key is a trace of a third matrix that is a product of multiplications of factor matrixes, each factor matrix has a random exponent and a base that is a third intermediate matrix, wherein different third intermediate matrixes are products of multiplying the random matrix by different intermediate matrixes and by the inverse of the random matrix.

Example 29 is a method for collecting data from a group of entitled members, the method comprising: receiving, by a collection unit, a message and a message signature; validating, by the collection unit, whether the message was received from one of the entitled members of the group, without identifying the entitled member that sent the message, wherein the validating comprises applying a second plurality of mathematical operations on a first group of secrets, a second group of secrets, and a first part of the message signature; rejecting, by the collection unit, the message when the message was not received from any entitled member of the group; and collecting data embedded in the message when the message was received from one of the entitled members of the group; wherein a message signature received from an entitled member comprises a first part, and a second part; wherein the second part is generated using a secret key; wherein the secret key is calculated by applying a first plurality of mathematical operations on member secrets allocated to the entitled member, and a random vector; wherein the first plurality of mathematical operations comprises a modulo operation, and calculation of products of multiplications of factors that have bases and random exponents; wherein the member secrets are calculated based on secrets from the first group of secrets allocated to the group, secrets from the second group of secrets allocated to the group, a random matrix and a subset of random vectors allocated to the entitled member; and wherein the collection unit has access to the first group of secrets and the second group of secrets but is unaware of an allocation of member secrets to the entitled members of the group.

In Example 30, the subject matter of Example 29 includes, wherein the secret key is a function of a set of matrixes, wherein different matrixes of the set are a function of the random matrix, an inverse of the random matrix, and an intermediate matrix that comprise first intermediate matrix elements, and second intermediate matrix elements.

In Example 31, the subject matter of Example 30 includes, wherein the first intermediate matrix elements are first intermediate products of a multiplication of first intermediate factors; and wherein the second intermediate matrix elements are second intermediate product of a multiplication of second intermediate factors.

In Example 32, the subject matter of Examples 30-31 includes, wherein a first intermediate factor has a base that is a secret from the first group of secrets and has a random exponent which is an element of the subset of random vectors allocated to the entitled member; and wherein a second intermediate factor has a base that is a secret from the second group of secrets and has a random exponent which is an element of the subset of random vectors $(V_j^x(i))$ allocated to the entitled member.

In Example 33, the subject matter of Examples 30-32 includes, wherein the intermediate matrixes are diagonal matrixes and wherein the secret key is a trace of a third matrix that is a product of multiplications of factor matrixes, each factor matrix has a random exponent and a base that is a third intermediate matrix, wherein different third intermediate matrixes are products of multiplying the random matrix by different intermediate matrixes and by the inverse of the random matrix.

Example 34 is a non-transitory computer readable medium including instructions for collecting data from a group of entitled members, which when executed by a machine, cause the machine to perform operations comprising: receiving, by a collection unit, a message and a message signature; validating, by a collection unit, whether the message was received from any entitled member of a group, without identifying the entitled member that sent the message; wherein the validating comprises applying a second plurality of mathematical operations on a first group of secrets, a second group of secrets, and a first part of the message signature; rejecting, by the collection unit, the message when validating that the message was not received from any entitled member of the group; and collecting data embedded in the message when validating that the message was received from any one of the entitled members of the group; wherein a message signature received from an entitled member comprises a first part, and a second part; wherein the second part is generated using a secret key; wherein the secret key is calculated by applying a first plurality of mathematical operations on member secrets allocated to the entitled member, and a random vector; wherein the first plurality of mathematical operations comprises a modulo operation, and calculation of products of multiplications of factors that have bases and random exponents; wherein the member secrets are calculated based on secrets from the first group of secrets allocated to the group, secret from the second group of secrets allocated to the group, a random matrix and a subset of random vectors allocated to the entitled member; and wherein the collection unit has access to the first group of secrets and the second group of secrets but is unaware of an allocation of member secrets to the entitled members of the group.

Example 35 is at least one machine-readable medium including instructions that, when executed by processing circuitry, cause the processing circuitry to perform operations to implement of any of Examples 1-34.

Example 36 is an apparatus comprising means to implement of any of Examples 1-34.

Example 37 is a system to implement of any of Examples 1-34.

Example 38 is a method to implement of any of Examples 1-34.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A collection device for collecting data from a group of entitled members, comprising:
   a communication circuit to receive a message and a message signature; and
   a hardware processor to:
     validate whether the message was received from one of the entitled members of the group, without identifying an entitled member of the group that sent the message, wherein the validating comprises applying a second plurality of mathematical operations on a first group of secrets, a second group of secrets, and a first part of the message signature;
     reject the message when the message was not received from any entitled member of the group; and
     collect data embedded in the message when the message was received from one of the entitled members of the group;
     wherein the message signature received from the entitled member of the group comprises a first part, and a second part;
     wherein the second part is generated using a secret key;
     wherein the secret key is calculated by applying a first plurality of mathematical operations on first member secrets allocated to the entitled member of the group, second member secrets allocated to the entitled member of the group, and a random vector;
     wherein the first plurality of mathematical operations comprises calculation of products of multiplications of factors that have bases and random exponents;
     wherein the first member secrets are calculated based on secrets from the first group of secrets allocated to the group, and a subset of random vectors allocated to the entitled member of the group;
     wherein the second member secrets are calculated based on secrets from the second group of secrets allocated to the group, and the subset of random vectors allocated to the entitled member of the group;
     wherein the first member secrets and the second member secrets are calculated by applying a modulo operation and additional operations; and
     wherein the collection device has access to the first group of secrets and the second group of secrets but is unaware of an allocation of first member secrets and second member secrets to the entitled member of the group.

2. The collection device according to claim 1, wherein the secret key is a function of a first product of a multiplication of first factors, and a second product of a multiplication of second factors.

3. The collection device according to claim 2, wherein each first factor has a first base that is calculated by applying a modulo operation (mod p) on a first intermediate product of a multiplication of first intermediate factors.

4. The collection device according to claim 3, wherein each second factor as a second base that is calculated by applying the modulo operation on a second intermediate product of a multiplication of second intermediate factors.

5. The collection device according to claim 4, wherein a first intermediate factor has a base that is a secret from the first group of secrets and has a random exponent which is an element of the subset of random vectors allocated to the entitled member of the group; and
   wherein a second intermediate factor has a base that is a secret from the second group of secrets and has a random exponent which is an element of the subset of random vectors allocated to the entitled member of the group.

6. The collection device according to claim 1, wherein the validating comprises calculating a validation secret key as a function of the first group of secrets, the second group of secrets, and the first part of the message signature.

7. The collection device according to claim 6, wherein the validating comprises:
   applying a modulo operation on a first validation product of a multiplication of first validation factors; and
   applying the modulo operation on a second validation product of a multiplication of second validation factors.

8. The collection device according to claim 1, wherein different first validation factors have bases that are different secrets from the first group of secrets and different random exponents;
   wherein different second validation factors have bases that are different secrets from the second group of secrets and the different random exponents; and
   wherein the different random exponents belong to the second part of the message signature.

9. The collection device according to claim 8, wherein the second part of the message signature is generated using a cryptographic process; wherein the validation comprises applying the cryptographic process, using the validation secret key, to provide a validation intermediate result.

10. The collection device according to claim 9, wherein the validating comprises comparing the validation intermediate result to the second part of the signature message; and determining that the message was received from any one of the entitled members of the group when the first part of the message signature is nonzero, and the validation intermediate result equals the second part of the signature message.

11. The collection device according to claim 1, wherein the first plurality of mathematical operations are calculated over a finite field having a predefined size (p), wherein the modulo operation has a divisor that equals the predefined size.

12. A method for collecting data from a group of entitled members, the method comprising:
   receiving, by a collection unit, a message, and a message signature;
   validating, by the collection unit, whether the message was received from one of the entitled members of the group, without identifying an entitled member of the group that sent the message, wherein the validating comprises applying a second plurality of mathematical operations on a first group of secrets, a second group of secrets and a first part of the message signature;
   rejecting, by the collection unit, the message when the message was not received from any entitled member of the group; and
   collecting data embedded in the message when the message was received from one of the entitled members of the group;
   wherein the message signature received from the entitled member of the group comprises a first part, and a second part;
   wherein the second part is generated using a secret key;
   wherein the secret key is calculated by applying a first plurality of mathematical operations on first member secrets allocated to the entitled member of the group, second member secrets allocated to the entitled member of the group, and a random vector;

wherein the first plurality of mathematical operations comprises calculation of products of multiplications of factors that have bases and random exponents;

wherein the first member secrets are calculated based on secrets from the first group of secrets allocated to the group, and a subset of random vectors allocated to the entitled member of the group;

wherein the second member secrets are calculated based on secrets from the second group of secrets allocated to the group, and the subset of random vectors allocated to the entitled member of the group;

wherein the first member secrets and the second member secrets are calculated by applying a modulo operation and additional operations; and wherein the collection unit has access to the first group of secrets and the second group of secrets but is unaware of an allocation of first member secrets and second member secrets to the entitled member of the group.

13. The method according to claim 12, wherein the secret key is a function of a first product of a multiplication of first factors, and a second product of a multiplication of second factors.

14. The method according to claim 13, wherein each first factor has a first base that is calculated by applying a modulo operation (mod p) on a first intermediate product of a multiplication of first intermediate factors.

15. The method according to claim 14, wherein each second factor as a second base that is calculated by applying the modulo operation on a second intermediate product of a multiplication of second intermediate factors.

16. The method according to claim 15, wherein a first intermediate factor has a base that is a secret from the first group of secrets and has a random exponent which is an element of the subset of random vectors allocated to the entitled member of the group; and wherein a second intermediate factor has a base that is a secret from the second group of secrets and has a random exponent which is an element of the subset of random vectors allocated to the entitled member of the group.

17. The method according to claim 12, wherein the validating comprises calculating, by the collection unit, a validation secret key as a function of the first group of secrets, the second group of secrets, and the first part of the message signature.

18. The method according to claim 17, wherein the validating comprises:

applying a modulo operation on a first validation product of a multiplication of first validation factors; and applying the modulo operation on a second validation product of a multiplication of second validation factors.

19. The method according to claim 12, wherein different first validation factors have bases that are different secrets from the first group of secrets and different random exponents; and wherein different second validation factors have bases that are different secrets from the second group of secrets and the different random exponents; wherein the different random exponents belong to the second part of the message signature.

20. The method according to claim 19, wherein the second part of the message signature is generated using a cryptographic process; and wherein the validation comprises applying the cryptographic process, using the validation secret key, to provide a validation intermediate result.

21. The method according to claim 20, wherein the validating comprises comparing the validation intermediate result to the second part of the signature message; and determining that the message was received from any one of the entitled members of the group when the first part of the message signature is nonzero, and the validation intermediate result equals the second part of the signature message.

22. The method according to claim 12, wherein the first plurality of mathematical operations are calculated over a finite field having a predefined size (p), wherein the modulo operation has a divisor that equals the predefined size.

23. A non-transitory computer readable medium including instructions for collecting data from a group of entitled members, which when executed by a machine, cause the machine to perform operations comprising:

receiving, by a collection unit, a message, and a message signature;

validating, by the collection unit, whether the message was received from one of the entitled members of the group, without identifying an entitled member of the group that sent the message, wherein the validating comprises applying a second plurality of mathematical operations on a first group of secrets, a second group of secrets, and a first part of the message signature;

rejecting, by the collection unit, the message when the message was not received from any entitled member of the group; and collecting data embedded in the message when the message was received from one of the entitled members of the group;

wherein the message signature received from the entitled member of the group comprises a first part, and a second part;

wherein the second part is generated using a secret key;

wherein the secret key is calculated by applying a first plurality of mathematical operations on first member secrets allocated to the entitled member of the group, second member secrets allocated to the entitled member, and a random vector;

wherein the first plurality of mathematical operations comprises calculation of products of multiplications of factors that have bases and random exponents;

wherein the first member secrets are calculated based on secrets from the first group of secrets allocated to the group, and a subset of random vectors allocated to the entitled member of the group;

wherein the second member secrets are calculated based on secrets from the second group of secrets allocated to the group, and the subset of random vectors allocated to the entitled member of the group;

wherein the first member secrets and the second member secrets are calculated by applying a modulo operation and additional operations; and wherein the collection unit has access to the first group of secrets and the second group of secrets but is unaware of an allocation of first member secrets and second member secrets to the entitled member of the group.

24. A collection device for collecting data from a group of entitled members, comprising:

a communication circuit to receive a message and a message signature; and a hardware processor to:

receive a message and a message signature;

validate whether the message was received from one of the entitled members of the group, without identifying an entitled member of the group that sent the message, wherein the validating comprises applying a second plurality of mathematical operations on a first group of secrets, a second group of secrets, and a first part of the message signature;

reject the message when the message was not received from any entitled member of the group; and collect data embedded in the message when the message was received from one of the entitled members of the group;

wherein the message signature received from the entitled member of the group comprises a first part, and a second part;

wherein the second part is generated using a secret key;

wherein the secret key is calculated by applying a first plurality of mathematical operations on member secrets allocated to the entitled member, and a random vector;

wherein the first plurality of mathematical operations comprises a modulo operation, and calculation of products of multiplications of factors that have bases and random exponents;

wherein the member secrets are calculated based on secrets from the first group of secrets allocated to the group, secrets from the second group of secrets allocated to the group, a random matrix and a subset of random vectors allocated to the entitled member of the group; and wherein the hardware processor has access to the first group of secrets and the second group of secrets but is unaware of an allocation of member secrets to the entitled member of the group.

25. The collection device according to claim 24, wherein the secret key is a function of a set of matrixes, wherein different matrixes of the set are a function of the random matrix, an inverse of the random matrix, and an intermediate matrix that comprise first intermediate matrix elements, and second intermediate matrix elements.

26. The collection device according to claim 25, wherein the first intermediate matrix elements are first intermediate products of a multiplication of first intermediate factors; and wherein the second intermediate matrix elements are second intermediate product of a multiplication of second intermediate factors.

27. The collection device according to claim 25, wherein a first intermediate factor has a base that is a secret from the first group of secrets and has a random exponent which is an element of the subset of random vectors allocated to the entitled member; and wherein a second intermediate factor has a base that is a secret from the second group of secrets and has a random exponent which is an element of the subset of random vectors ($V_j^x(i)$) allocated to the entitled member of the group, wherein V is a vector, j is a vector index of the subset of random vectors, x is group member index of the entitled member of the group, and i is an index of an element of the vector V.

28. The collection device according to claim 25, wherein the intermediate matrixes are diagonal matrixes and wherein the secret key is a trace of a third matrix that is a product of multiplications of factor matrixes, each factor matrix has a random exponent and a base that is a third intermediate matrix, wherein different third intermediate matrixes are products of multiplying the random matrix by different intermediate matrixes and by the inverse of the random matrix.

29. A method for collecting data from a group of entitled members, the method comprising:

receiving, by a collection unit, a message, and a message signature;

validating, by the collection unit, whether the message was received from one of the entitled members of the group, without identifying an entitled member of the group that sent the message, wherein the validating comprises applying a second plurality of mathematical operations on a first group of secrets, a second group of secrets, and a first part of the message signature;

rejecting, by the collection unit, the message when the message was not received from any entitled member of the group; and collecting data embedded in the message when the message was received from one of the entitled members of the group;

wherein the message signature received from the entitled member of the group comprises a first part, and a second part;

wherein the second part is generated using a secret key;

wherein the secret key is calculated by applying a first plurality of mathematical operations on member secrets allocated to the entitled member, and a random vector;

wherein the first plurality of mathematical operations comprises a modulo operation, and calculation of products of multiplications of factors that have bases and random exponents;

wherein the member secrets are calculated based on secrets from the first group of secrets allocated to the group, secrets from the second group of secrets allocated to the group, a random matrix, and a subset of random vectors allocated to the entitled member of the group; and wherein the collection unit has access to the first group of secrets and the second group of secrets but is unaware of an allocation of member secrets to the entitled member of the group.

30. The method according to claim 29, wherein the secret key is a function of a set of matrixes, wherein different matrixes of the set are a function of the random matrix, an inverse of the random matrix, and an intermediate matrix that comprise first intermediate matrix elements, and second intermediate matrix elements.

31. The method according to claim 30, wherein the first intermediate matrix elements are first intermediate products of a multiplication of first intermediate factors; and wherein the second intermediate matrix elements are second intermediate product of a multiplication of second intermediate factors.

32. The method according to claim 30, wherein a first intermediate factor has a base that is a secret from the first group of secrets and has a random exponent which is an element of the subset of random vectors allocated to the entitled member; and wherein a second intermediate factor has a base that is a secret from the second group of secrets and has a random exponent which is an element of the subset of random vectors ($V_j^x(i)$) allocated to the entitled member of the group, wherein V is a vector, j is a vector index of the subset of random vectors, x is group member index of the entitled member of the group, and i is an index of an element of the vector V.

33. The method according to claim 30, wherein the intermediate matrixes are diagonal matrixes and wherein the secret key is a trace of a third matrix that is a product of multiplications of factor matrixes, each factor matrix has a random exponent and a base that is a third intermediate matrix, wherein different third intermediate matrixes are products of multiplying the random matrix by different intermediate matrixes and by the inverse of the random matrix.

34. A non-transitory computer readable medium including instructions for collecting data from a group of entitled members, which when executed by a machine, cause the machine to perform operations comprising:

receiving, by a collection unit, a message, and a message signature;

validating, by a collection unit, whether the message was received from any entitled member of a group, without identifying an entitled member of the group that sent the message; wherein the validating comprises applying a second plurality of mathematical operations on a first group of secrets, a second group of secrets, and a first part of the message signature;

rejecting, by the collection unit, the message when validating that the message was not received from any entitled member of the group; and collecting data embedded in the message when validating that the message was received from any one of the entitled members of the group;

wherein a message signature received from an entitled member of the group comprises a first part, and a second part;

wherein the second part is generated using a secret key;

wherein the secret key is calculated by applying a first plurality of mathematical operations on member secrets allocated to the entitled member, and a random vector;

wherein the first plurality of mathematical operations comprises a modulo operation, and calculation of products of multiplications of factors that have bases and random exponents;

wherein the member secrets are calculated based on secrets from the first group of secrets allocated to the group, secret from the second group of secrets allocated to the group, a random matrix and a subset of random vectors allocated to the entitled member; and wherein the collection unit has access to the first group of secrets and the second group of secrets but is unaware of an allocation of member secrets to the entitled member of the group.

* * * * *

UNITED STATES PATENT AND TRADEMARK OFFICE
CERTIFICATE OF CORRECTION

| | | |
|---|---|---|
| PATENT NO. | : 11,405,366 B2 | Page 1 of 1 |
| APPLICATION NO. | : 17/615726 | |
| DATED | : August 2, 2022 | |
| INVENTOR(S) | : Aviad Kipnis | |

It is certified that error appears in the above-identified patent and that said Letters Patent is hereby corrected as shown below:

In the Claims

In Column 33, Line 23, in Claim 24, after "to the", delete a linebreak

In Column 35, Line 13, in Claim 34, delete "message;" and insert --message,-- therefor Signed and Sealed this
Sixteenth Day of May, 2023

*Katherine Kelly Vidal*
Katherine Kelly Vidal
*Director of the United States Patent and Trademark Office*